United States Patent
Sun et al.

(10) Patent No.: US 12,308,913 B2
(45) Date of Patent: May 20, 2025

(54) PORT SELECTION CODEBOOK ENHANCEMENT

(71) Applicant: APPLE INC., Cupertino, CA (US)

(72) Inventors: Haitong Sun, Cupertino, CA (US); Chunhai Yao, Beijing (CN); Chunxuan Ye, San Diego, CA (US); Dawei Zhang, Saratoga, CA (US); Hong He, San Jose, CA (US); Wei Zeng, Saratoga, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/476,560

(22) Filed: Sep. 28, 2023

(65) Prior Publication Data

US 2024/0030971 A1 Jan. 25, 2024

Related U.S. Application Data

(63) Continuation of application No. 17/593,246, filed as application No. PCT/CN2021/092766 on May 10, 2021.

(51) Int. Cl.
*H04B 7/06* (2006.01)
*H04L 5/00* (2006.01)

(52) U.S. Cl.
CPC ......... *H04B 7/0608* (2013.01); *H04B 7/0626* (2013.01); *H04B 7/0634* (2013.01); *H04B 7/0639* (2013.01); *H04B 7/0658* (2013.01)

(58) Field of Classification Search
CPC .. H04B 7/0608; H04B 7/0626; H04B 7/0634; H04B 7/0639; H04B 7/0658;
(Continued)

(56) References Cited

U.S. PATENT DOCUMENTS 11,109,448 B2 * 8/2021 Si ...................... H04L 27/26025
11,689,268 B2 * 6/2023 Rahman ................ H04L 5/0048
375/262
(Continued)

FOREIGN PATENT DOCUMENTS

EP 3402089 A1 11/2018
WO 2021068915 A1 4/2021

OTHER PUBLICATIONS

U.S. Appl. No. 17/593,246, Non-Final Office Action, Dec. 6, 2023, 12 pages.
U.S. Appl. No. 17/593,246, Notice of Allowance, Mar. 26, 2024, 9 pages.
Apple Inc., "Views on Rel-17 CSI enhancement", #R1-2103094, 3GPP TSG- RAN WG1 Meeting #104b-e, e-Meeting, Agenda Item 8.1.4, 6 pages.
(Continued)

*Primary Examiner* — Faruk Hamza
*Assistant Examiner* — Aixa A Guadalupe Cruz
(74) *Attorney, Agent, or Firm* — Dorsey & Whitney LLP

(57) ABSTRACT

Apparatus and methods are provided for port selection codebook configuration. A user equipment (UE) may decode a channel state information (CSI) report configuration (CSI-ReportConfig) from a base station. The CSI-ReportConfig indicates up to L CSI reference signal (CSI-RS) ports for selection by the UE out of P CSI-RS ports configured for measuring and reporting CSI. The UE determines selected CSI-RS ports out of the P CSI-RS ports. The selected CSI-RS ports include the L CSI-RS ports or less. The UE generates a port selection matrix $W_1$ corresponding to the selected CSI-RS ports. The UE also generates an indication of the port selection matrix $W_1$ to the base station. The CSI-ReportConfig may further configure the UE to select a subset of frequency basis. The UE determines a selected subset of frequency basis and generates a frequency basis selection matrix $W_f$ corresponding to the selected subset of frequency basis.

17 Claims, 13 Drawing Sheets

(58) Field of Classification Search
CPC ..... H04B 7/063; H04B 7/0691; H04L 5/0023; H04L 5/005; H04L 5/0051; H04L 5/0053; H04L 5/0057; H04L 5/0094; H04W 24/10
See application file for complete search history.

(56) References Cited

U.S. PATENT DOCUMENTS

| | | |
|---|---|---|
| 2020/0036708 A1 | 11/2020 | Hao et al. |
| 2021/0075482 A1 | 3/2021 | Rahman et al. |
| 2023/0145057 A1* | 5/2023 | Zhang .................. H04L 5/0051 370/329 |
| 2023/0261832 A1* | 8/2023 | Rupasinghe ........... H04B 7/088 370/329 |
| 2023/0291441 A1* | 9/2023 | Muruganathan ..... H04B 7/0456 |

OTHER PUBLICATIONS

PCT/CN2021/092766, #International Search Report and Written Opinion, Feb. 14, 2022 00:00:00.0, 9 pages.
Samsung, "Views on Rel-17 CSI enhancements", #R1-2103227, 3GPP TSG RAN WG1#104b-e, e-Meeting, Agenda Item 8.1.4, 13 pages.
Spreadtrum Communications, "Discussion on CSI enhancement for multi-TRP and FR1 FDD reciprocity", #R1-2102447, 3GPP TSG RAN WG1 #104b-e, e-Meetings, Agenda Item 8.1.4, 8 pages.
Vivo, "Further discussion and evaluation on MTRP CSI and partial reciprocity", #R1-2102512, 3GPP TSG RAN WG1 #104b-e, e-Meeting, Agenda 8.1.4, 28 pages.
Huawei, Hisilicon, "Discussion on CSI enhancements for Rel-17", R1-2007592, 3GPP TSG RAN WG1 Meeting #103-e, E-Meeting, Agenda Item 8.1.4, Oct. 26,-Nov. 13, 2020, 18 pages.

* cited by examiner $$[w^\ell(1) \cdots w^\ell(N_3)] = \begin{pmatrix} v_0 \cdots v_{L-1} & \\ & v_0 \cdots v_{L-1} \end{pmatrix} \begin{pmatrix} \tilde{c}_{0,1,\ell} & \cdots & \tilde{c}_{0,M,\ell} \\ \vdots & \ddots & \vdots \\ \tilde{c}_{2L-1,1,\ell} & \cdots & \tilde{c}_{2L-1,M,\ell} \end{pmatrix} \begin{pmatrix} w_{f,1}^H \\ \vdots \\ w_{f,M}^H \end{pmatrix}$$

$\underbrace{\phantom{XXX}}_{W^\ell}$ $\underbrace{\phantom{XXX}}_{W_1 \text{ Spatial basis}}$ $\underbrace{\phantom{XXX}}_{W_2^\ell \text{ Compressed combination coefficients}}$ $\underbrace{\phantom{XXX}}_{W_f^H \; M \text{ frequency basis}}$ Spatial basis: $2L$; Compressed combination coefficients: $M$; $M$ frequency basis

FIG. 1

| CQI Subband 0 | CQI Subband 1 | CQI Subband 2 | CQI Subband 3 | CQI Subband 4 | CQI Subband 5 | CQI Subband 6 |
|---|---|---|---|---|---|---|
| PMI Subband 0 | PMI Subband 1 | | PMI Subband 2 | | PMI Subband 3 | |

| 2Mv-Mi basis | N-2Mv basis | Mi basis |
|---|---|---|

FIG. 3

PORT SELECTION CODEBOOK ENHANCEMENT

TECHNICAL FIELD

This application relates generally to wireless communication systems, including port selection codebook configuration.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1 illustrates a PMI matrix (codebook) used in certain embodiments herein.

FIG. 2 illustrates CQI subbands in relation to PMI subbands for R=½ in accordance with one embodiment.

FIG. 3 illustrates a location of Mi basis that can be reported by the UE to the base station in accordance with one embodiment.

DETAILED DESCRIPTION

Figure 4:
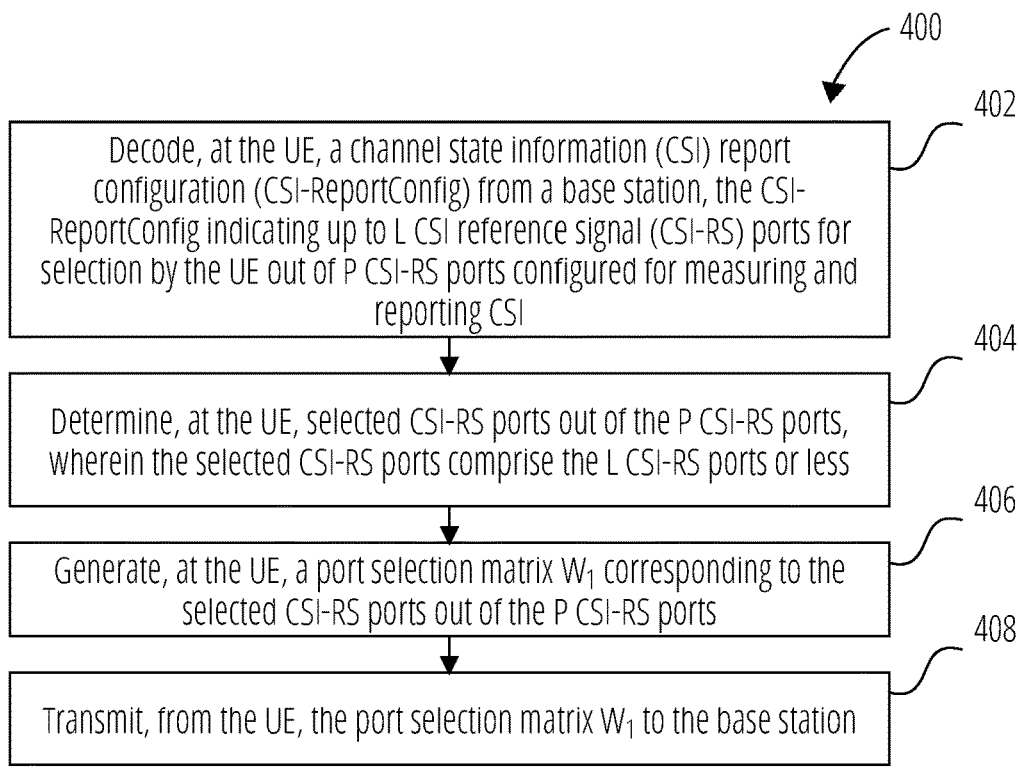
FIG. 4 illustrates a method for a UE in accordance with one embodiment.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

Many wireless communication standards provide for the use of known signals (e.g., pilot or reference signals) for a variety of purposes, such as synchronization, measurements, equalization, control, etc. For example, in cellular wireless communications, a reference signals (RS) may be provided to deliver a reference point for downlink power. When a wireless communication device or mobile device (i.e., UE) attempts to determine downlink power (e.g., the power of the signal from a base station, such as eNB for LTE and gNB for NR), it measures the power of the reference signal and uses it to determine the downlink cell power. The reference signal also assists the receiver in demodulating the received signals. Since the reference signals include data known to both the transmitter and the receiver, the receiver may use the reference signal to determine/identify various characteristics of the communication channel. This is commonly referred to as channel estimation, which is used in many high-end wireless communications such as LTE and 5G-NR communications. Known channel properties of a communication link in wireless communications are referred to as channel state information (CSI), which provides information indicative of the combined effects of, for example, scattering, fading, and power decay with distance. The CSI makes it possible to adapt transmissions to current channel conditions, which is useful for achieving reliable communications with high data rates in multi-antenna systems.

Oftentimes multi-antenna systems use precoding for improved communications. Precoding is an extension of beamforming to support multi-stream (or multi-layer) transmissions for multi-antenna wireless communications and is used to control the differences in signal properties between the respective signals transmitted from multiple antennas by modifying the signal transmitted from each antenna according to a precoding matrix. In one sense, precoding may be considered a process of cross coupling the signals before transmission (in closed loop operation) to equalize the demodulated performance of the layers. The precoding matrix is generally selected from a codebook that defines multiple precoding matrix candidates, wherein a precoding matrix candidate is typically selected according to a desired performance level based on any of a number of different factors such as current system configuration, communication environment, and/or feedback information from the receiver (e.g., UE) receiving the transmitted signal(s).

The feedback information is used in selecting a precoding matrix candidate by defining the same codebook at both the transmitter and the receiver, and using the feedback information from the receiver as an indication of a preferred precoding matrix. In such cases the feedback information includes what is referred to as a precoding matrix index (PMI), which can be based on properties of the signals received at the receiver. For example, the receiver may determine that a received signal has relatively low signal-to-noise ratio (SNR), and may accordingly transmit a PMI that would replace a current precoding matrix with a new precoding matrix to increase the signal-to-noise ratio (SNR).

In 3GPP NR systems, two types of codebook, Type I codebook and Type II codebook, have been standardized for CSI feedback in support of advanced MIMO operations. The two types of codebook are constructed from a two-dimensional (2D) digital Fourier transform (DFT) based grid of beams, enabling CSI feedback of beam selection and phase shift keying (PSK) based co-phase combining between two polarizations. Type II codebook based CSI feedback also reports the wideband and subband amplitude information of the selected beams, allowing for more accurate CSI to be obtained. This, in turn, provides improved precoded MIMO transmissions over the network.

Under certain circumstances, the set of precoding matrix candidates that can be selected from the codebook may need to be limited. For example, the network may prevent the receiver from selecting some precoding matrix candidates while allowing it to select others. This is commonly referred to as codebook subset restriction (CBSR). CBSR may include the transmission of a CBSR bitmap from a transmitter (e.g., base station) to a receiver (e.g., UE). The CBSR bitmap typically includes a bit corresponding to each precoding matrix in the codebook, with the value of each bit (e.g., "0" or "1") indicating to the receiver whether or not the receiver is restricted from considering a corresponding precoding matrix candidate as a preferred precoding candidate to request from the base station. One disadvantage of CBSR is increased signaling overhead. For example, in some systems, the CBSR bitmap might contain a high number (e.g. 64) of bits per channel, requiring a transmitting device to transmit a relatively large amount of information to implement CBSR for all of its channels.

For multi-user multiple-in multiple-out (MIMO) systems, a base station may configure multiple UEs (e.g. two UEs) to report their precoding matrices, or precoding matrix candidates in mutually orthogonal directions. To reduce the CSI computation complexity for the UE, a base station may remove from consideration, based on uplink measurements, certain unlikely beams, thereby allowing the UE to not test the precoders formed by those beams that were removed from consideration. In other words, in order to reduce computation complexity, based on UL measurements the base station can restrict the UE to narrow down the search space, the UE therefore not having to consider the entire codebook.

For 3GPP Release-15 (Rel-15) Type II port selection codebook, a beam-formed channel state information reference signal (CSI-RS) exploits downlink (DL) and uplink (UL) channel reciprocity. For example, the base station estimates the UL channel, and based on channel reciprocity, acquires the channel state information regarding the DL channel. Then based on the DL channel information, gNB precodes different port in CSI-RS differently for UE to perform further CSI reporting for CSI refinement. The UE measures CSI-RS and provides feedback to the base station. For a total number X of CSI-RS ports, X/2 ports are horizontally polarized (H-pol) and X/2 ports are vertically polarized (V-pol). L CSI-RS ports are selected out of X/2 CSI-RS ports. The first CSI-RS port may be selected every d ports (e.g., d is either 1 or 2 or 3 or 4). Then, consecutive L (e.g., 1, 2, 4) ports are selected with wrap around.

3GPP Rel-16 Type II port selection codebook enhancement uses the same port selection design as 3GPP Rel-15. When subband PMI is configured, a frequency domain DFT matrix can be used to compress the linear combination coefficients.

For Type II port selection codebook, it may be assumed that the base station will precode the CSI-RS based on channel reciprocity (i.e., DL channel estimated based on UL channel). For frequency division duplexing (FDD), exact channel reciprocity may not exist, especially when the duplexing distance is large. However, even for FDD, partial reciprocity may still exist when, for example, the angle of arrival or departure is similar between DL and UL carriers and/or the channel delay profile is similar between DL and UL carriers.

FIG. 1 illustrates a PMI matrix (codebook) used in certain embodiments herein. In the illustrated example, a Type II port selection codebook structure is given by $W^\ell = W_1 * W_2^\ell * W_f^H$ (also notated for simplicity herein as $W = W_1 * W_2 * W_f$ or W=W1W2Wf), where W is the PMI matrix, $W_1$ is a spatial basis selection matrix (also referred to herein as a port selection matrix $W_1$), $W_2$ provides compressed combination coefficients, $W_f$ is a frequency basis selection matrix, $\ell$ is a layer index, $N_3$ is the number of PMI subbands, L is the number of selected ports, M is the number of frequency basis, and H denotes a Hermitian matrix or conjugate transpose operation. These and other parameters of $W^\ell = W_1 * W_2^\ell * W_f^H$ are shown in other figures and/or described in detail below.

In certain systems, for port selection codebook enhancements utilizing DL/UL reciprocity of angle and/or delay, support is provided for codebook structure $W = W_1 * W_2 * W_f$ where the port selection matrix $W_1$ is a free selection matrix, with the identity matrix as a special configuration. The frequency basis selection matrix $W_f$ is a DFT based compression matrix in which $N_3=N_{CQISubband}*R$ and Mv>=1, where R is a size of the channel quality indicator (CQI) subband divided by the size of the PMI subband, and My is the number of selected frequency basis. $N_3$ is the number of PMI subbands for frequency basis selection. At least one value of Mv>1 may be supported. In certain such systems, value(s) of My may be decided (e.g., Mv=2). In other embodiments, support of Mv>1 is a UE optional feature, taking into account UE complexity related to codebook parameters. However, candidate value(s) of R, mechanisms for configuring/indicating to the UE and/or mechanisms for selecting/reporting by UE for $W_f$ have yet to be determined. In addition, or in other systems, $W_f$ can be turned off by base station. When turned off, $W_f$ may be an all-one vector.

Embodiments herein provide port selection codebook enhancements for $W=W_1*W_2*W_f$. Certain embodiments provide designs for the port selection matrix $W_1$. In addition, or in other embodiments, designs are provided for the frequency basis selection matrix $W_f$.

1. Design for Port Selection Matrix $W_1$

In certain embodiments, the UE selects L ports out of P ports. For example, the UE may select L CSI-RS ports of a total P CSI-RS ports for port selection, wherein P/2 port(s) is H-pol and P/2 port(s) is V-pol.

1.1 Port Selection Matrix $W_1$ Structures

In one embodiment, which is polarization independent, the port selection matrix $W_1$ is a P×L matrix. Each column in the port selection matrix $W_1$ is P×1, wherein only one entry is 1 (indicating selection of a port) in each column and the other entries are 0. Different columns in the port selection matrix $W_1$ cannot be the same. Thus, one distinctive port is selected in each column.

In another embodiment, which is polarization dependent, the port selection matrix $W_1$ is given by $W_1=$ $$W_1 = \begin{pmatrix} W_{1,1} & 0 \\ 0 & W_{1,1} \end{pmatrix},$$

wherein $W_{1,1}$ is a P/2×L matrix. Each column in $W_{1,1}$ is P/2×1, wherein only one entry is 1 in each column and the other entries are 0. Different columns in $W_{1,1}$ cannot be the same. For example, if 32 ports are configured with 16 H-pol ports and the other 16 V-pol ports, and if the UE is configured to select 8 ports of the 32 ports, then the UE selects 4 H-pol ports and 4 V-pol ports.

In another embodiment, which is polarization dependent, the port selection matrix $W_1$ is given by $$W_1 = \begin{pmatrix} W_{1,1} & 0 \\ 0 & W_{1,2} \end{pmatrix},$$

wherein $W_{1,1}$ and $W_{1,2}$ are each a P/2×L matrix. In each column in $W_{1,1}$ or $W_{1,2}$, only one entry is 1 and the other entries are zero. Different columns in $W_{1,1}$ or $W_{1,2}$ cannot be the same. $W_{1,2}$ can be the same as or different from $W_{1,1}$. Thus, the V-pol ports may be selected in a different way than the H-pol ports. In other words, each polarization may be independently selected.

1.2 Indication of the Port Selection Matrix $W_1$

In one embodiment, the UE is configured to select L CSI-RS ports. To indicate the P×L port selection matrix $W_1$ discussed above the UE uses a bit width of $\lceil \log_2(C(P, L)) \rceil$, where C is a combinatorial function, e.g., $$C(N, M) = \frac{N!}{M!(N-M)!}.$$

The bit width is the number of bits used to report the selection matrix $W_1$.

In another embodiment, when the UE is configured to select L CSI-RS ports and the port selection matrix $W_1$ is given by $$W_1 = \begin{pmatrix} W_{1,1} & 0 \\ 0 & W_{1,1} \end{pmatrix},$$

the bit width is $\lceil \log_2(C(P/2,L)) \rceil$.

In another embodiment, when the UE is configured to select L CSI-RS ports and the port selection matrix $W_1$ is given by $$W_1 = \begin{pmatrix} W_{1,1} & 0 \\ 0 & W_{1,2} \end{pmatrix},$$

the bit width is $2\times \lceil \log_2(C(P/2,L)) \rceil$.

In one embodiment, the UE is configured to select any number of CSI-RS ports<=L. To indicate the P×L port selection matrix $W_1$ discussed above, the UE uses a bit width of $$\left\lceil \log_2\left(\sum_{l=1}^{L} C(P, l)\right) \right\rceil.$$

In another embodiment, when the UE is configured to select any number of CSI-RS ports<=L and the port selection matrix $W_1$ is given by $$W_1 = \begin{pmatrix} W_{1,1} & 0 \\ 0 & W_{1,1} \end{pmatrix},$$

the bit width is $$\left\lceil \log_2\left(\sum_{l=1}^{L} C(P/2, l)\right) \right\rceil.$$

In another embodiment, when the UE is configured to select any number of CSI-RS ports<=L and the port selection matrix $W_1$ is given by $$W_1 = \begin{pmatrix} W_{1,1} & 0 \\ 0 & W_{1,2} \end{pmatrix},$$

the bit width is $$2\times \left\lceil \log_2\left(\sum_{l=1}^{L} C(P/2, l)\right) \right\rceil.$$

1.3 Determining CSI-RS Ports with More than One CSI-RS Resource for CMR Per CSI Report Configuration For the port selection matrix $W_1$, according to certain embodiments, more than one CSI-RS resource for channel measurement resource (CMR) can be configured per CSI report configuration (e.g., per CSI-ReportConfig information element (IE)). In one such embodiment, the UE determines that the total CSI-RS ports are the union of all the ports in all CSI-RS resources configured in the CSI-Report-Config IE. The index of the CSI-RS port may be based on the CSI-RS resource identifier (ID) (i.e., NZP-CSI-RS-ResourceID).

In another embodiment, the UE first reports the selected CSI-RS resource ID (NZP-CSI-RS-ResourceId). Then, the UE reports the port selection among the CSI-RS ports configured in the reported CSI-RS resource ID (NZP-CSI-RS-ResourceId).

In another embodiment, different CSI-RS resources are associated with different PMI subbands. One CSI-RS resource can be associated with multiple PMI subbands. Each PMI subband can only have one associated CSI-RS resource. For each PMI subband, the same or different port selection matrix can be reported based on the associated CSI-RS resource, and the same number of ports are selected.

1.4 Determining CSI-RS Ports with More than One Pattern Configured for a CSI-RS Resource For the port selection matrix $W_1$, according to certain embodiments, more than one pattern (i.e., CSI-RS-ResourceMapping) can be configured for a CSI-RS resource. In one such embodiment, the UE determines that the total CSI-RS ports are the union of all the ports in all configured patterns, i.e., CSI-RSResourceMapping, in the same CSI-RS resources.

In another embodiment, the UE first reports the selected one of the configured CSI-RS-ResourceMapping. Then, the UE reports the port selection among the CSI-RS ports configured in the reported CSI-RS-ResourceMapping.

In another embodiment, different CSI-RS-ResourceMappings are associated with different PMI subbands. One CSI-RS-ResourceMapping can be associated with multiple PMI subbands. Each PMI subband can only have one associated CSI-RS-ResourceMapping. For each PMI subband, the same or different port selection matrix can be reported based on the associated CSI-RS-ResourceMapping.

Certain embodiments apply different pattern restrictions. For example, the resource mapping may be restricted to having no overlapping resource elements (REs) (e.g., for a subcarrier). As another example, the resource mapping may be restricted to a same number of ports.

1.5 Example Embodiments for Layer Independent or Layer Common Port Selection Matrix $W_1$ The port selection matrix $W_1$ can be either layer independent or layer common. For each layer, notation for the port selection matrix is indicated as $W_1^\ell$ where $\ell$ is the layer index. In certain layer independent embodiments, the UE can independently report $W_1^\ell$. In certain layer common embodiments, the UE reports a single $W_1$ for all layers $W_1^1 = W_1^2 =, \ldots, = W_1^N$.

1.6 Example Embodiments for Subband Independent or Subband Common Port Selection Matrix $W_1$ The port selection matrix $W_1$ can be either subband independent or subband common. A base station may configure a UE to report $N_3$ PMI subbands. For each subband, notation for the port selection matrix is indicated as $W_1^n$ where n is a subband index. In certain subband independent embodiments, the UE can independently report for each subband $W_1^n$, n=0, 1, ..., N3−1. In certain subband common embodiments, the UE reports a single $W_1$ for all subbands $W_1^0 = W_1^1 =, \ldots, = W_1^{N_3-1}$.

Hybrid embodiments may also be used. For example, when multiple groups of subbands are configured, for each group of subband, the UE selects the same port. However, the UE may select different ports in different groups of subbands.

1.7 Example Embodiments for Subband Based Port Selection Restrictions

Certain embodiments include subband based port selection restrictions. In such embodiments, there may be X CSI-RS ports (either total or in each polarization) and the PMI subbands may be divided into multiple groups. For each group of PMI subbands, the UE is configured or allowed to select from a subset of the X CSI-RS ports. Further, for each group of PMI subbands, the UE does not need to test and/or select the CSI-RS ports not in the configured subset.

2. Design for frequency basis selection matrix $W_f$

As discussed above, certain embodiments provide designs for the frequency basis selection matrix $W_f$, which may be combined with any of the embodiments discussed above for port selection matrix $W_1$.

2.1 When the Frequency Basis Selection Matrix $W_f$ is Turned Off by the Base Station In certain embodiments, the frequency basis selection matrix $W_f$ may be turned off by the base station. In one such embodiment, the PMI matrix is degenerated into $W=W_1$, where $W_1$ is a column vector that selects L CSI-RS ports. There is only L non-zero entry in $W_1$ and each non-zero entry is a phase and amplitude factor to select the corresponding port and then report the combination coefficient for that selected port.

In another embodiment when the frequency basis selection matrix $W_f$ is turned off by the base station, the PMI matrix is degenerated into $W=W_1 W_2$, where $W_1$ is the port selection matrix discussed above and $W_2$ includes more than one column. Each column of $W_2$ corresponds to a PMI subband. For each column in $W_2$, there is at most L non-zero entries. Each non-zero entry is a phase and amplitude factor for a combination coefficient for the corresponding selected port.

2.2 Number of PMI Subbands for Frequency Basis Selection

In one embodiment, the total number of PMI subbands for frequency basis selection is $N_{CQISubband}*R$. $N_{CQISubband}$ is the number of CQI subbands configured by the network (NW). R is a ratio configured by the NW. As indicated above, R is a size of the CQI subband divided by the size of the PMI subband. In certain wireless systems, only R=1 and R=2 are allowed. However, for 3GPP Rel-17, R can be configured to be less than 1 (e.g., ½, ¼, ⅛, etc.). For example, FIG. 2 illustrates CQI subbands (CQI subband 0, CQI subband 1, CQI subband 2, CQI subband 3, CQI subband 4, CQI subband 5, CQI subband 6) in relation to PMI subbands (PMI subband 0, PMI subband 1, PMI subband 2, PMI subband 3) according to one embodiment for R=½. The PMI subband to CQI subband mapping can start from the lowest frequency or the highest frequency.

2.3 Network Configuration of Wideband Reporting

In certain embodiments for port selection codebook, the NW can configure wideband reporting. For example, the NW may configure the UE for wideband CQI reporting and/or wideband PMI reporting.

2.4 Selection of My Frequency Basis of N Frequency Basis

In certain embodiments, for the frequency basis selection matrix $W_f$, My frequency basis is selected of N frequency basis (subbands). The direct current (DC), i.e. first frequency basis, is selected. To indicate the selection of the remaining frequency basis, according to one embodiment, free selection is used wherein the UE can select any Mv−1 out N−1 frequency basis and the bit width is $\lceil \log_2(C(N-1, Mv-1)) \rceil$.

In another embodiment, to indicate the selection of the remaining frequency basis, the NW configures a list of possible bases that the UE can select from. For example, the NW can configure a total D possible selection of Mv−1 out of N−1 frequency basis, in which the UE can select one out of D possible selections.

2.5 NW Configuration of a Subset of Frequency Basis for the UE to Select

In certain embodiments, for the frequency basis selection matrix $W_f$, the NW can configure a subset of the frequency basis for the UE to select. In one such embodiment, the subset configuration is based on a window constrained selection wherein the UE is further constrained to select from consecutive k*Mv frequency basis, wherein k*Mv<N.

The location of the k*Mv consecutive ports (i.e., Mi) can be reported by the UE or configured by the NW. For example, FIG. 3 illustrates a location of Mi basis that can be reported by the UE to the base station. In illustrated example, k=2 and the location of the selected Mi basis is shown in relation to 2Mv−Mi basis and n−2Mv basis.

In another embodiment, the NW can configure a list of a subset of frequency basis for UE selection. In this example, the locations of the k*Mv ports do not have to be consecutive. Every entry in the list configures one subset of the frequency basis for the UE to select. In certain such embodiments, the subset is configured via a bitmap.

2.6 Example Quantization and Feedback for the Combinational Coefficient Matrix $W_2$ In certain embodiments, the coefficients in the combinational coefficient matrix $W_2$ may be divided into different groups or a subset. For example, four different groups may include a first group (Group 1) comprising the strongest coefficient among all the coefficients (e.g., in one of the polarizations H-pol or V-pol), a second group (Group 2) comprising the strongest coefficient in the other polarization, a third group (Group 3) comprising a subset of the remaining coefficients to be reported, and a fourth group (Group 4) comprising the remaining coefficients that will not be reported.

2.7 Example Determination of Number of Coefficients to Report

In one embodiment, the base station configures a fixed number or percentage (e.g., 25%) of the coefficients in the combinational coefficient matrix $W_2$ that the UE is to report. In another embodiment, the base station configures an upper bound, a lower bound, or both upper and lower bounds for the number of coefficients in the combinational coefficient matrix $W_2$ that the UE is to report. The UE may, for example, report the actual number of coefficients without violating the configured upper and/or lower bounds.

2.8 Example Reporting of an Index of Coefficients in the Combinational Coefficient Matrix $W_2$ In certain embodiments, the UE is configured to report an index (location) of the reported coefficients in the combinational coefficient matrix $W_2$, for each group. For the subband indication (i.e., the column index of the frequency basis selection matrix $W_f$), the column index may be predetermined (i.e., fixed in the standard) for one or more groups of coefficients. In addition, or in other embodiments, the UE may freely report the column index for one or more of the groups. For example, with reference to Groups 1-4 above, it may be useful for the column index of Group 1 and/or Group 2 to be predetermined and for the UE to freely report the column index for Group 3 and Group 4.

For the port indication (i.e., the row index of the frequency basis selection matrix $W_f$), the row index may be predetermined (i.e., fixed in the standard) for one or more groups of coefficients. In addition, or in other embodiments, the UE may freely report the row index for one or more of the groups. For example, with reference to Groups 1-4 above, it may be useful for the row index of Group 1 and/or Group 2 to be predetermined and for the UE to freely report the row index for Group 3 and Group 4.

2.9 Example Reporting of Phase and Amplitude Quantization for Coefficients in the Combinational Coefficient Matrix $W_2$ In certain embodiments, reporting of the phase and amplitude quantization of reported coefficients in the combinational coefficient matrix $W_2$ is based on the group (e.g., Groups 1-4 discussed above). For Group 1, the phase and amplitude is not reported because the strongest coefficient is used as a reference such that it is considered to have an amplitude of 1 and a phase of 0. The UE reports the phase and amplitude quantization of Group 2 with a higher resolution (e.g., larger bit width for amplitude and/or phase) as compared to the resolution used to report the phase and amplitude quantization of Group 3. However, in other embodiments, the UE may report the phase and amplitude quantization of Group 2 and Group 3 using the same resolution.

3.0 Example Methods and Devices

FIG. 4 is a flowchart of a method 400 for a UE according to certain embodiments. In block 402, the method 400 includes decoding, at the UE, a channel state information (CSI) report configuration (CSI-ReportConfig) from a base station, the CSI-ReportConfig indicating up to L CSI reference signal (CSI-RS) ports for selection by the UE out of P CSI-RS ports configured for measuring and reporting CSI. In block 404, the method 400 includes determining, at the UE, selected CSI-RS ports out of the P CSI-RS ports, wherein the selected CSI-RS ports comprise the L CSI-RS ports or less. In block 406, the method 400 includes generating, at the UE, a port selection matrix $W_1$ corresponding to the selected CSI-RS ports out of the P CSI-RS ports. In block 408, the method 400 includes transmitting, from the UE, the port selection matrix $W_1$ to the base station.

In certain embodiments of the method 400, the port selection matrix $W_1$ is a P×L matrix, wherein each of L columns in the port selection matrix $W_1$ is P×1 with only one entry in each of the L columns comprising a 1 and other entries in each of the L columns comprising a 0, and wherein different ones of the L columns in the port selection matrix $W_1$ are not the same as one another. In certain such embodiments wherein the UE selects the L CSI-RS ports out of the P CSI-RS ports, transmitting the port selection matrix $W_1$ comprises transmitting the port selection matrix $W_1$ using a bit width of $\lceil \log_2(C(P, L)) \rceil$. In other embodiments wherein the UE selects less than or equal to the L CSI-RS ports out of the P CSI-RS ports, transmitting the port selection matrix $W_1$ comprises using a bit width of $$\left\lceil \log_2\left(\sum_{l=1}^{L} C(P, l)\right) \right\rceil.$$

where C is a combinatorial function.

In one embodiment of the method 400, the port selection matrix $W_1$ is given by $$W_1 = \begin{pmatrix} W_{1,1} & 0 \\ 0 & W_{1,1} \end{pmatrix},$$

wherein $W_{1,1}$ is a P/2×L matrix, wherein each of L columns in $W_{1,1}$ is P/2×1 with only one entry in each of the L columns comprising a 1 and other entries in each of the L columns comprising a 0, wherein different columns in cannot be the same, and wherein first P/2 CSI-RS ports are horizontally polarized (H-pol) and second P/2 CSI-RS ports are vertically polarized (V-pol). In certain such embodiments wherein the UE selects the L CSI-RS ports out of the P/2 CSI-RS ports, transmitting the port selection matrix $W_1$ comprises using a bit width of $\lceil \log_2(C(P/2,L)) \rceil$. In other embodiments wherein the UE selects less than or equal to the L CSI-RS ports out of the P/2 CSI-RS ports, transmitting the port selection matrix $W_1$ comprises using a bit width of $$\left\lceil \log_2 \left( \sum_{l=1}^{L} C(P/2, l) \right) \right\rceil.$$

In one embodiment of the method 400, the port selection matrix $W_1$ is given by $$W_1 = \begin{pmatrix} W_{1,1} & 0 \\ 0 & W_{1,2} \end{pmatrix},$$

wherein $W_{1,1}$ and $W_{1,2}$ are each a P/2×L matrix, wherein in each of L columns in $W_{1,1}$ or $W_{1,2}$ only one entry is a 1 and other entries are a 0, wherein different columns in $W_1$; or Wu cannot be the same, and wherein first P/2 CSI-RS ports are horizontally polarized (H-pol) and second P/2 CSI-RS ports are vertically polarized (V-pol). $W_{1,2}$ may be the same as $W_{1,1}$. Alternatively, $W_{1,2}$ may be different than $V_{1,1}$. In certain such embodiments wherein the UE selects the L CSI-RS ports out of the P/2 CSI-RS ports, transmitting the port selection matrix $W_1$ comprises using a bit width of $2 \times \lceil \log_2(C(P/2,L)) \rceil$. In other embodiments wherein the UE selects less than or equal to the L CSI-RS ports out of the P/2 CSI-RS ports, transmitting the port selection matrix $W_1$ comprises using a bit width of $$2 \times \left\lceil \log_2 \left( \sum_{l=1}^{L} C(P/2, l) \right) \right\rceil.$$

In one embodiment of the method 400, the CSI-ReportConfig configures more than one CSI-RS resource for channel measurement resource (CMR), wherein total CSI-RS ports are a union of all ports in all CSI-RS resources configured in the CSI-ReportConfig, and wherein a CSI-RS port index is based on a CSI-RS resource identifier (ID).

In one embodiment of the method 400, the CSI-ReportConfig configures more than one CSI-RS resource for channel measurement resource (CMR), wherein the method 400 further comprises: reporting a selected CSI-RS resource identifier (ID); and reporting a port selection configured in the selected CSI-RS resource ID.

In one embodiment of the method 400, the port selection matrix $W_1$ is layer independent, wherein transmitting the port selection matrix $W_1$ comprises independently reporting as $W_1^\ell$ where $\ell$ is a layer index.

In one embodiment of the method 400, the port selection matrix $W_1$ is layer common, wherein transmitting the port selection matrix $W_1$ comprises reporting a single port selection matrix $W_1$ for all layers.

In one embodiment of the method 400, the port selection matrix $W_1$ is subband independent, wherein transmitting the port selection matrix $W_1$ comprises independently reporting as $W_1^n$ where n is a subband index.

In one embodiment of the method 400, the port selection matrix $W_1$ is subband common, wherein transmitting the port selection matrix $W_1$ comprises reporting a single port selection matrix $W_1$ for all subbands.

Figure 5:
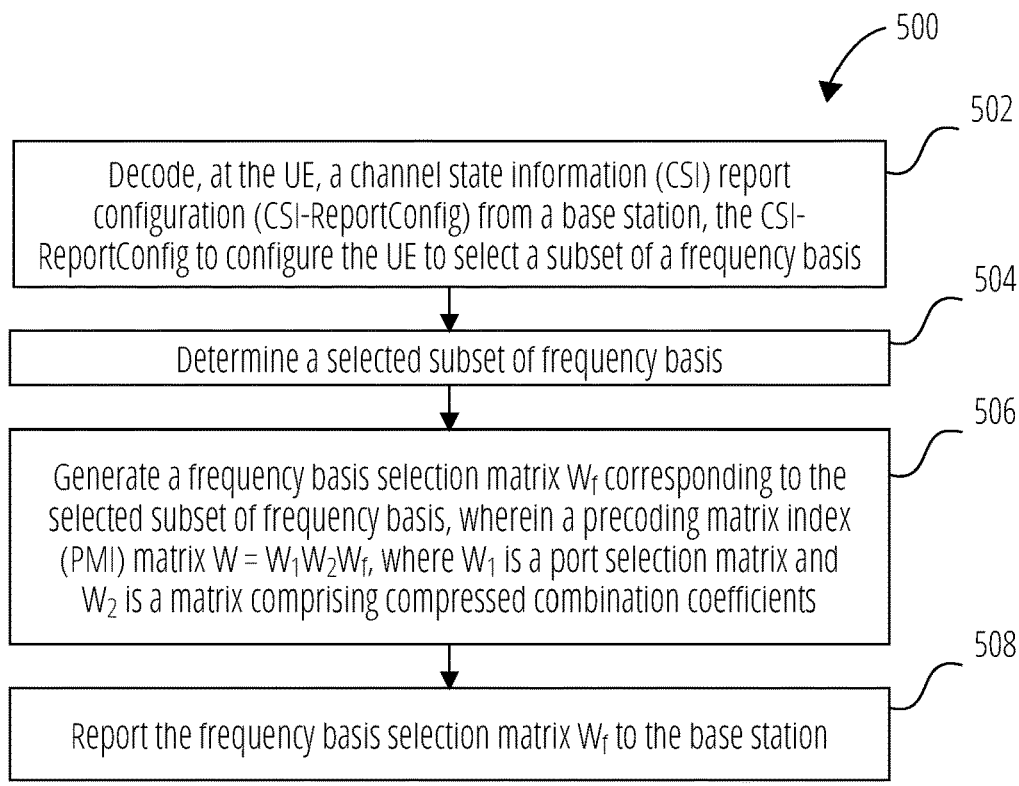
FIG. 5 illustrates a method for a UE in accordance with one embodiment.

FIG. 5 is a flow chart of a method 500 of a UE according to certain embodiments. The method 500 shown in FIG. 5 may be used with or independent from the method 400 shown in FIG. 4. In block 502, the method 500 includes decoding, at the UE, a channel state information (CSI) report configuration (CSI-ReportConfig) from a base station, the CSI-ReportConfig to configure the UE to select a subset of a frequency basis. In block 504, the method 500 includes determining a selected subset of frequency basis. In block 506, the method 500 includes generating a frequency basis selection matrix $W_f$ corresponding to the selected subset of frequency basis, wherein a precoding matrix index (PMI) matrix $W=W_1 W_2 W_f$, where $W_2$ is a matrix comprising compressed combination coefficients. In block 508, the method 500 includes reporting the frequency basis selection matrix $W_f$ to the base station.

One embodiment of the method 500 further includes processing an instruction from the base station to turn off the frequency basis selection matrix $W_f$, wherein the PMI matrix W degenerates into $W=W_1$, wherein the port selection matrix $W_1$ is a column vector that selects the L CSI-RS ports, wherein the port selection matrix $W_1$ comprises L non-zero entries, and wherein each of the L non-zero entries comprises a phase and amplitude factor to select and report a combination coefficient for a corresponding port.

One embodiment of the method 500 further includes processing an instruction from the base station to turn off the frequency basis selection matrix $W_f$, wherein the PMI matrix W degenerates into $W=W_1 W_2$, wherein $W_2$ comprises more than one column, wherein each column corresponds to a PMI subband, wherein for each column there is at most L non-zero entries, and wherein each of the L non-zero entries comprises a phase and amplitude factor for a combination coefficient for a corresponding port.

In one embodiment of the method 500, a total number of PMI subbands for frequency basis selection is $N_{CQISubband} * R$, where $N_{CQISubband}$ is a number of channel quality indicator (CQI) subbands configured by the base station and R is a size of a CQI subband divided by a size of a PMI subband.

In one embodiment of the method 500, the CSI-ReportConfig configures the UE for at least one of wideband channel quality indicator (CQI) reporting and wideband PMI reporting.

In one embodiment of the method 500, the CSI-ReportConfig configures the UE to select a direct current (DC) frequency basis and any Mv−1 out of N−1 frequency basis, and to report the frequency basis selection matrix $W_f$ using a bit width of $\lceil \log_2(C(N-1, Mv-1)) \rceil$.

In one embodiment of the method 500, the CSI-ReportConfig configures the UE to select a direct current (DC) frequency basis and one of D possible selections of Mv−1 out of N−1 frequency basis.

In one embodiment of the method 500, the CSI-ReportConfig comprises a window constrained selection of the subset of the frequency basis, wherein the UE is constrained to select from consecutive k*Mv frequency basis out of N frequency basis, where k is an integer and k*Mv<N. The method 500 may further include reporting a location of the consecutive k*Mv frequency basis to the base station. Alternatively, the base station may configure a location of the consecutive k*Mv frequency basis.

In one embodiment of the method 500, the CSI-Report-Config comprises a list of frequency basis subsets, wherein each entry in the list configures a different subset of frequency basis for the UE to select.

Embodiments contemplated herein include an apparatus comprising means to perform one or more elements of the method 400 and/or the method 500. This apparatus may be, for example, an apparatus of a UE (such as a wireless device 1502 that is a UE, as described herein).

Embodiments contemplated herein include one or more non-transitory computer-readable media comprising instructions to cause an electronic device, upon execution of the instructions by one or more processors of the electronic device, to perform one or more elements of the method 400 and/or the method 500. This non-transitory computer-readable media may be, for example, a memory of a UE (such as a memory 1506 of a wireless device 1502 that is a UE, as described herein).

Embodiments contemplated herein include an apparatus comprising logic, modules, or circuitry to perform one or more elements of the method 400 and/or the method 500. This apparatus may be, for example, an apparatus of a UE (such as a wireless device 1502 that is a UE, as described herein).

Embodiments contemplated herein include an apparatus comprising: one or more processors and one or more computer-readable media comprising instructions that, when executed by the one or more processors, cause the one or more processors to perform one or more elements of the method 400 and/or method 500. This apparatus may be, for example, an apparatus of a UE (such as a wireless device 1502 that is a UE, as described herein).

Embodiments contemplated herein include a computer program or computer program product comprising instructions, wherein execution of the program by a processor is to cause the processor to carry out one or more elements of the method 400 and/or method 500. The processor may be a processor of a UE (such as a processor(s) 1504 of a wireless device 1502 that is a UE, as described herein). These instructions may be, for example, located in the processor and/or on a memory of the UE (such as a memory 1506 of a wireless device 1502 that is a UE, as described herein).

Figure 6:
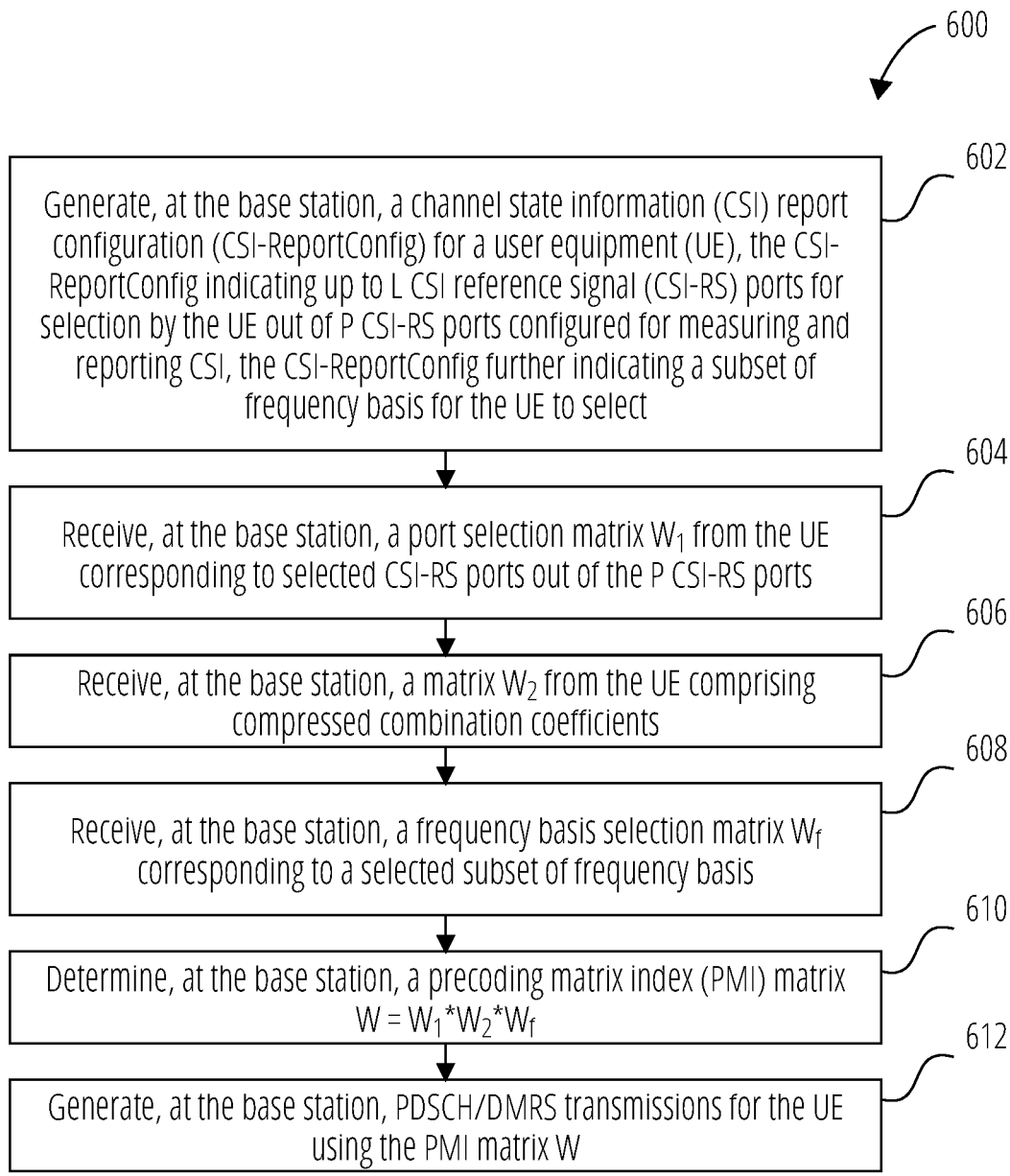
FIG. 6 illustrates a method for a base station in accordance with one embodiment.

FIG. 6 is a flowchart of a method 600 for a base station according to certain embodiments. In block 602, method 600 includes generating, at the base station, a channel state information (CSI) report configuration (CSI-ReportConfig) for a user equipment (UE), the CSI-ReportConfig indicating up to L CSI reference signal (CSI-RS) ports for selection by the UE out of P CSI-RS ports configured for measuring and reporting CSI, the CSI-ReportConfig further indicating a subset of frequency basis for the UE to select. In block 604, method 600 includes receiving, at the base station, a port selection matrix $W_1$ from the UE corresponding to selected CSI-RS ports out of the P CSI-RS ports. In block 606, method 600 includes receiving, at the base station, a matrix $W_2$ from the UE comprising compressed combination coefficients. In block 608, method 600 includes receiving, at the base station, a frequency basis selection matrix $W_f$ corresponding to a selected subset of frequency basis. In block 610, method 600 includes determining, at the base station, a precoding matrix index (PMI) matrix $W=W_1*W_2*W_f$. In block 612, method 600 includes generating, at the base station, physical downlink shared channel (PDSCH) demodulation reference signal (DMRS) transmissions for the UE using the PMI matrix W.

In one embodiment of the method 600, the port selection matrix $W_1$ is a P×L matrix, wherein each of L columns in the port selection matrix $W_1$ is P×1 with only one entry in each of the L columns comprising a 1 and other entries in each of the L columns comprising a 0, and wherein different ones of the L columns in the port selection matrix $W_1$ are not the same as one another.

In one embodiment of the method 600, the port selection matrix $W_1$ is given by $$W_1 = \begin{pmatrix} W_{1,1} & 0 \\ 0 & W_{1,1} \end{pmatrix},$$

wherein $W_{1,1}$ is a P/2×L matrix, wherein each of L columns in $W_{1,1}$ is P/2×1 with only one entry in each of the L columns comprising a 1 and other entries in each of the L columns comprising a 0, wherein different columns in Wu cannot be the same, and wherein first P/2 CSI-RS ports are horizontally polarized (H-pol) and second P/2 CSI-RS ports are vertically polarized (V-pol).

In one embodiment of the method 600, the port selection matrix $W_1$ is given by $$W_1 = \begin{pmatrix} W_{1,1} & 0 \\ 0 & W_{1,2} \end{pmatrix},$$

wherein $W_{1,1}$ and $W_{1,2}$ are each a P/2×L matrix, wherein in each of L columns in $W_{1,1}$ or $W_{1,2}$ only one entry is a 1 and other entries are a 0, wherein different columns in $W_{1,1}$ or $W_{1,2}$ cannot be the same, and wherein first P/2 CSI-RS ports are horizontally polarized (H-pol) and second P/2 CSI-RS ports are vertically polarized (V-pol).

In one embodiment, the method 600 further comprises turning off the frequency basis selection matrix $W_f$, wherein the PMI matrix W degenerates into $W=W_1$, wherein the port selection matrix $W_1$ is a column vector that selects the L CSI-RS ports, wherein the port selection matrix $W_1$ comprises L non-zero entries, and wherein each of the L non-zero entries comprises a phase and amplitude factor for a combination coefficient for a corresponding port.

In one embodiment, the method 600 further comprises turning off the frequency basis selection matrix $W_f$, wherein the PMI matrix W degenerates into $W=W_1W_2$, wherein $W_2$ comprises more than one column, wherein each column corresponds to a PMI subband, wherein for each column there is at most L non-zero entries, and wherein each of the L non-zero entries comprises a phase and amplitude factor for a combination coefficient for a corresponding port.

In one embodiment of the method 600, a total number of PMI subbands for frequency basis selection is $N_{CQISubband}*R$, where $N_{CQISubband}$ is a number of channel quality indicator (CQI) subbands configured by the base station and R is a size of a CQI subband divided by a size of a PMI subband.

In one embodiment, the method 600 further comprises configuring the UE for at least one of wideband channel quality indicator (CQI) reporting and wideband PMI reporting.

In one embodiment, the method 600 further comprises configuring the UE to select a direct current (DC) frequency basis and any Mv−1 out of N−1 frequency basis, and to report the frequency basis selection matrix $W_f$ using a bit width of $\lceil \log_2(C(N-1, Mv-1)) \rceil$.

In one embodiment, the method 600 further comprises configuring the UE to select a direct current (DC) frequency basis and one of D possible selections of Mv−1 out of N−1 frequency basis.

In one embodiment, the method 600 further comprises configuring a window constrained selection of the subset of the frequency basis, wherein the UE is constrained to select from consecutive k*Mv frequency basis out of N frequency basis, where k is an integer and k*Mv<N. In certain such embodiments, the method 600 further includes receiving, at the base station, an indication from the UE of a location of the consecutive k*Mv frequency basis. Alternatively, the method 600 may further include configuring a location of the consecutive k*Mv frequency basis for the UE.

In one embodiment of the method 600, the CSI-Report-Config comprises a list of frequency basis subsets, wherein each entry in the list configures a different subset of frequency basis for the UE to select.

Embodiments contemplated herein include an apparatus comprising means to perform one or more elements of the method 600. This apparatus may be, for example, an apparatus of a base station (such as a network device 1518 that is a base station, as described herein).

Embodiments contemplated herein include one or more non-transitory computer-readable media comprising instructions to cause an electronic device, upon execution of the instructions by one or more processors of the electronic device, to perform one or more elements of the method 600. This non-transitory computer-readable media may be, for example, a memory of a base station (such as a memory 1522 of a network device 1518 that is a base station, as described herein).

Embodiments contemplated herein include an apparatus comprising logic, modules, or circuitry to perform one or more elements of the method 600. This apparatus may be, for example, an apparatus of a base station (such as a network device 1518 that is a base station, as described herein).

Embodiments contemplated herein include an apparatus comprising: one or more processors and one or more computer-readable media comprising instructions that, when executed by the one or more processors, cause the one or more processors to perform one or more elements of the method 600. This apparatus may be, for example, an apparatus of a base station (such as a network device 1518 that is a base station, as described herein).

Embodiments contemplated herein include a signal as described in or related to one or more elements of the method 600.

Embodiments contemplated herein include a computer program or computer program product comprising instructions, wherein execution of the program by a processing element is to cause the processing element to carry out one or more elements of the method 600. The processor may be a processor of a base station (such as a processor(s) 1520 of a network device 1518 that is a base station, as described herein). These instructions may be, for example, located in the processor and/or on a memory of the base station (such as a memory 1522 of a network device 1518 that is a base station, as described herein).

Figure 7:
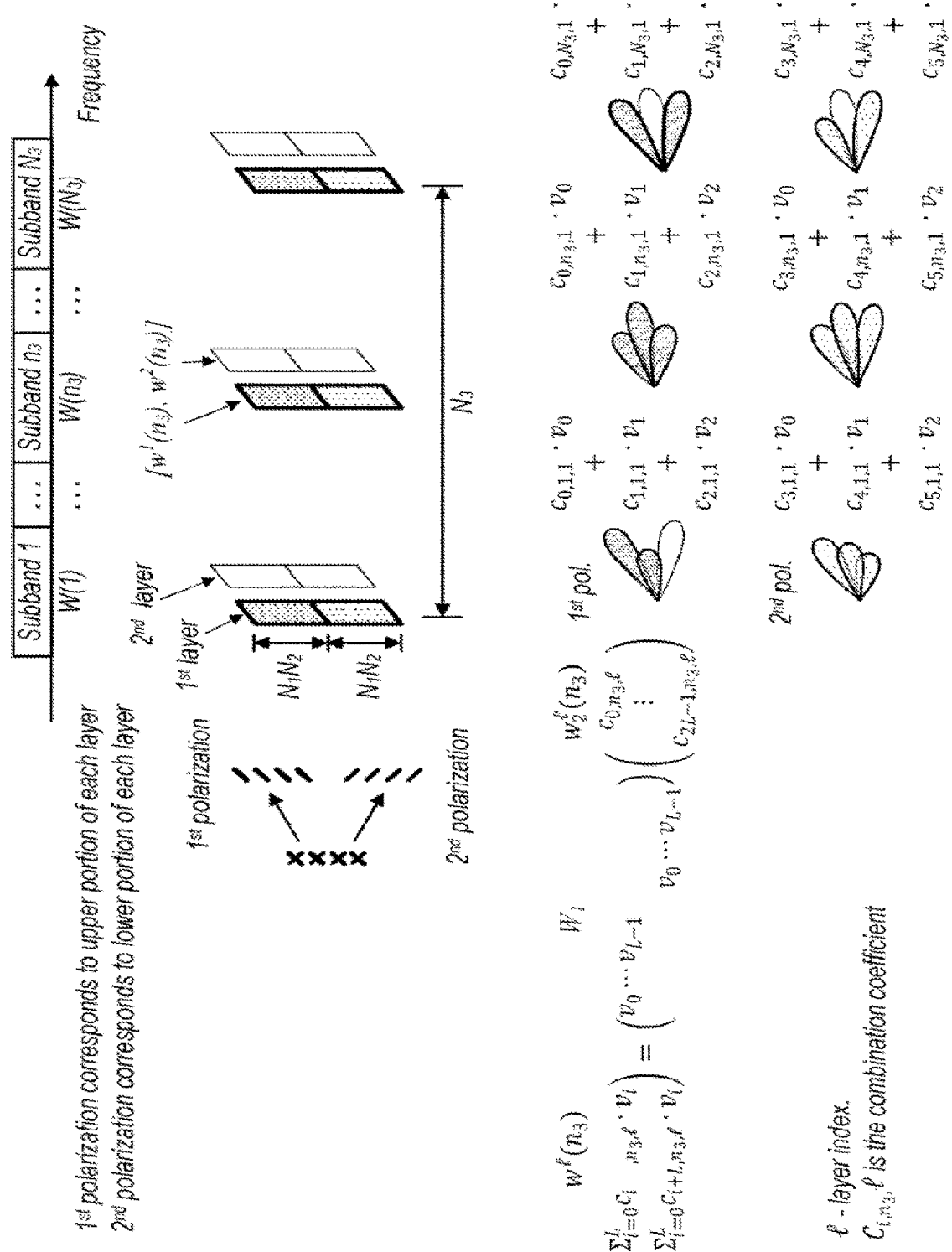
FIG. 7 shows an exemplary diagram illustrating the precoding structure associated with Type II CSI reporting, which may be used with certain embodiments.

FIG. 7 shows an exemplary diagram illustrating the precoding structure associated with Type II CSI reporting, which may be used with certain embodiments. The CSI may be reported to the base station to indicate which precoding is preferred by the UE. In Type II reporting, the precoding matrix is reported for each band, and is represented by a linear combination of a set of a specified number L of DFT vectors representing each column. As discussed herein, L corresponds to the number of selected ports. As illustrated in FIG. 7, there may be a specified number $N_3$ subbands (or $N_3$ PMI subbands), with a corresponding precoding matrix W for each subband. Each precoding matrix includes two columns, $w^1$ and $w^2$. Each column corresponds to the precoding vector for one layer. For each layer, the precoding vector may be further divided into two parts, a first polarization and second polarization. The L DFT vectors are common for all subbands and are used in subband-specific combinations. Specifically, each column vector is a weighted summation of the L vectors. The weighting (or combination) coefficients for the combination/combined weight are indicated in FIG. 7 by $c_0$, $c_1$, and $c_2$. As indicated in the example of FIG. 7, $v_0$, $v_1$, and $v_2$ represent three DFT vectors. The UE reports to the base station, which three DFT vectors are preferred.

Figure 8:
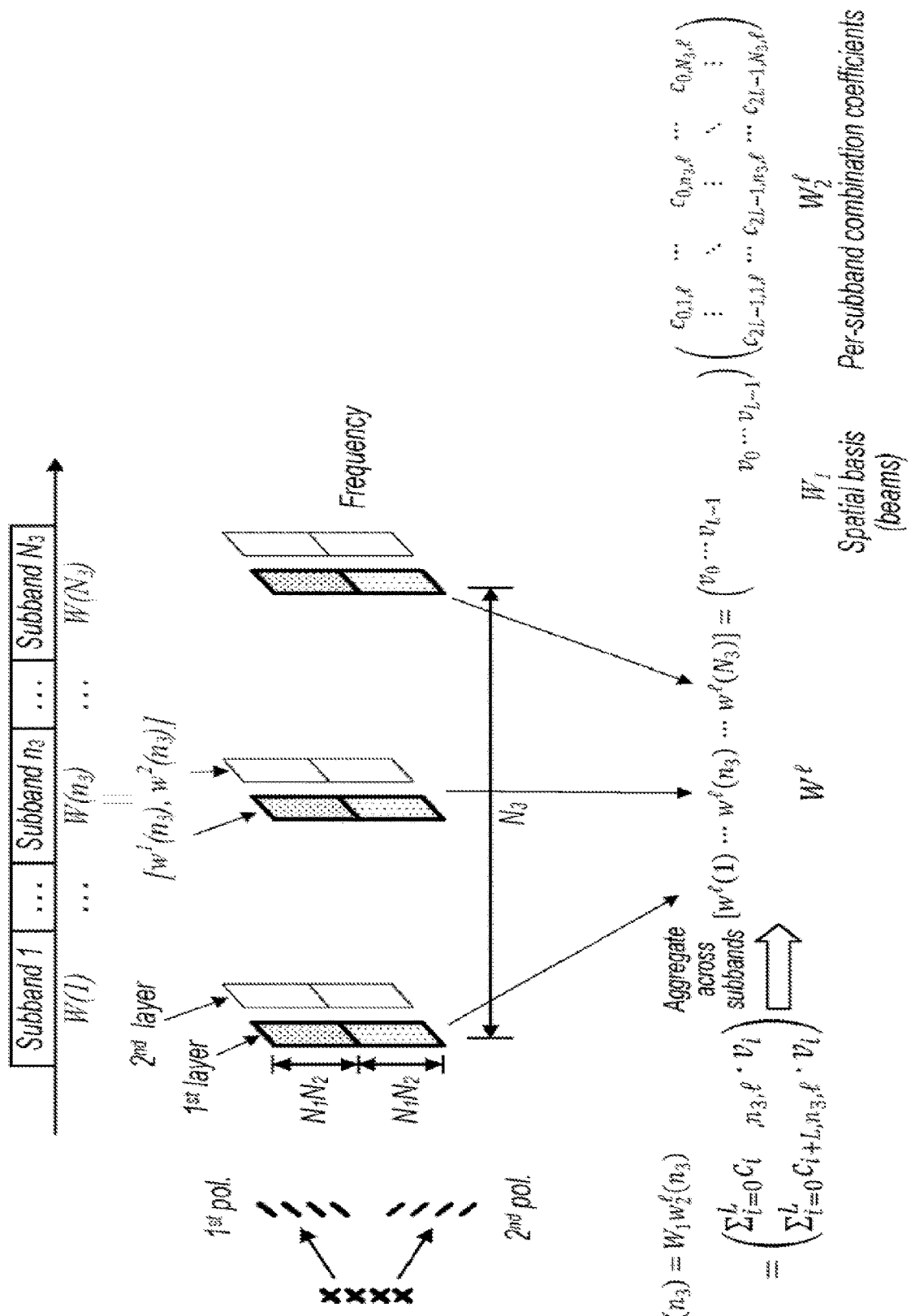
FIG. 8 shows an exemplary diagram illustrating the reporting structure used by the UE to report back to the base station, which may be used with certain embodiments.

FIG. 8 shows an exemplary diagram illustrating the reporting structure used by the UE to report back to the base station, which may be used with certain embodiments. Each subband has its own corresponding set of combination coefficients, and eventually the UE reports the combination coefficients. When considering the reporting by the UE, the Type II overhead is dominated by the subband combination coefficient. According to the information shown in FIG. 8, the total number of entries is $2L \times N_3$, there is multi-bit for amplitude, and there are multi-bit for phase. In one example, in a worst case scenario, there may be 19 subbands, 32 transmit (TX) ports, and a CSI payload size of more than 1000 bits. Therefore, it would be beneficial to reduce the Type II CSI overhead.

Figure 9:
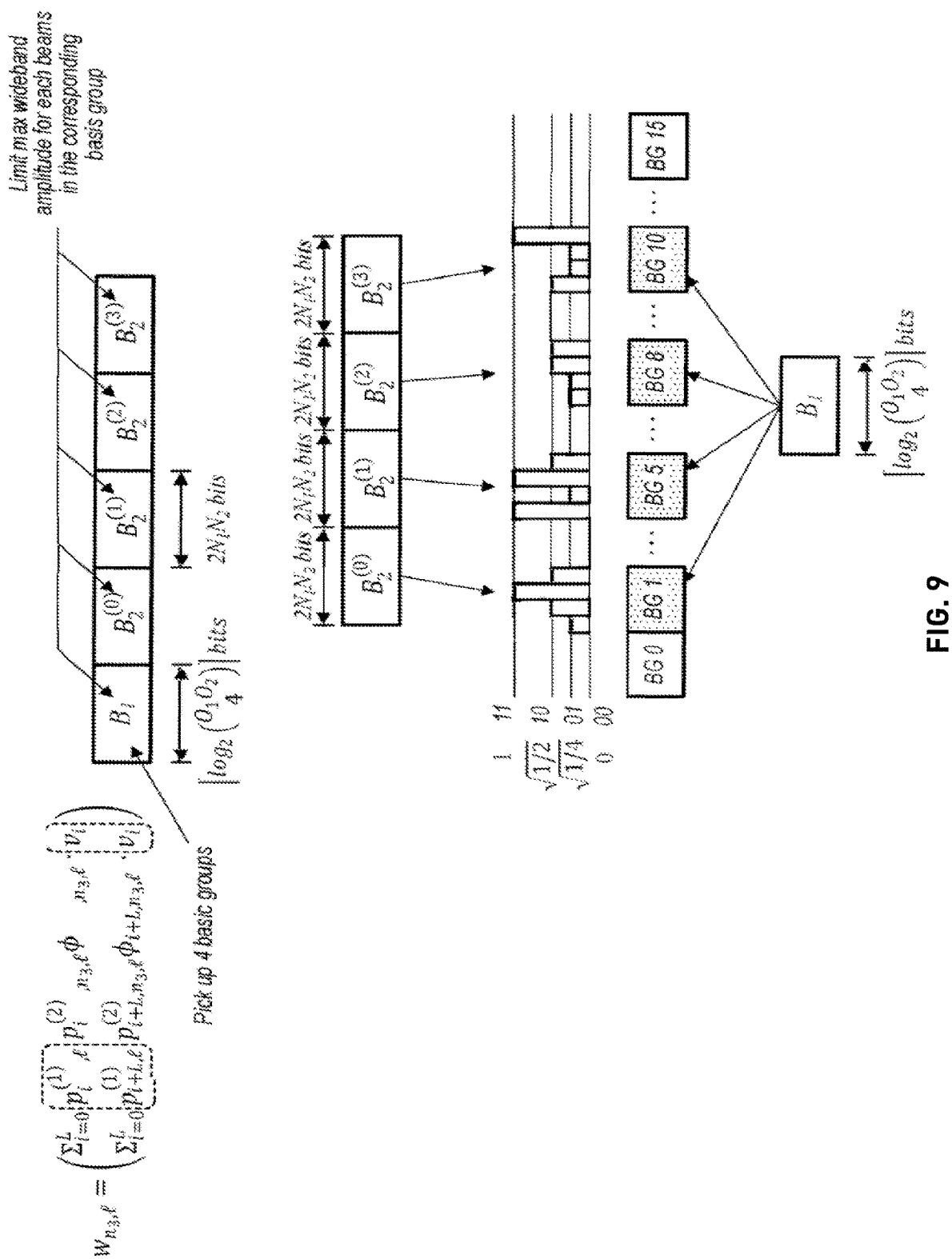
FIG. 9 shows an exemplary diagram illustrating CBSR associated with Type II CSI reporting, which may be used with certain embodiments.

FIG. 9 shows an exemplary diagram illustrating CBSR associated with Type II CSI reporting, which may be used with certain embodiments. FIG. 9 provides an indication of how CBSR is configured. Overall, a bit sequence is provided to the UE. The bit sequence includes two parts, and each sequence indicates the maximum allowed magnitude for the DFT beams. Accordingly, $O_1 O_2$ beam groups are divided into two categories, restricted or unrestricted. For the basis in an unrestricted beam group, the wideband amplitude is not restricted (e.g., it may have eight different values). For the basis in a restricted beam group, a maximum allowed wideband amplitude is configured (e.g., it may have four different values). That is, the restriction is on a spatial basis. Four spatial basis groups are selected and the maximum wideband amplitude for each beam in the corresponding basis group is limited.

As indicated in FIG. 9, there may be two antennas in the vertical dimension (number [$N_1$] of antennas=2) and two antennas in the horizontal direction (number [$N_2$] of antennas=2), yielding sixteen beam groups (BGs). The base station selects four out of the sixteen BGs for consideration. In the example shown, BG 1, BG 5, BG 8, and BG 10 are selected. Selection of these four beam groups is indicated by the first bit sequence, $B_1$. For each beam group, the base station further signals the UE a short sequence containing eight bits. The eight bits are divided into four groups, each group corresponding to one beam in this group. The four groups are shown in FIG. 9 as $B_2^{(0)}$, $B_2^{(1)}$, $B_2^{(2)}$, and $B_2^{(3)}$, which can indicate four different maximum amplitude levels. There are four beams in each group, and each beam can indicate the maximum allowed power that the UE may consider in reporting CSI. The maximum amplitude may thereby be controlled for spatial beams. Thus, shown in FIG. 9, CBSR restricts beam groups BG 1, BG 5, BG 8, and BG 10, with each group consisting of an $N_1N_2$ basis, with the maximum wideband amplitude configured for each beam in each restricted beam group.

Figure 10:
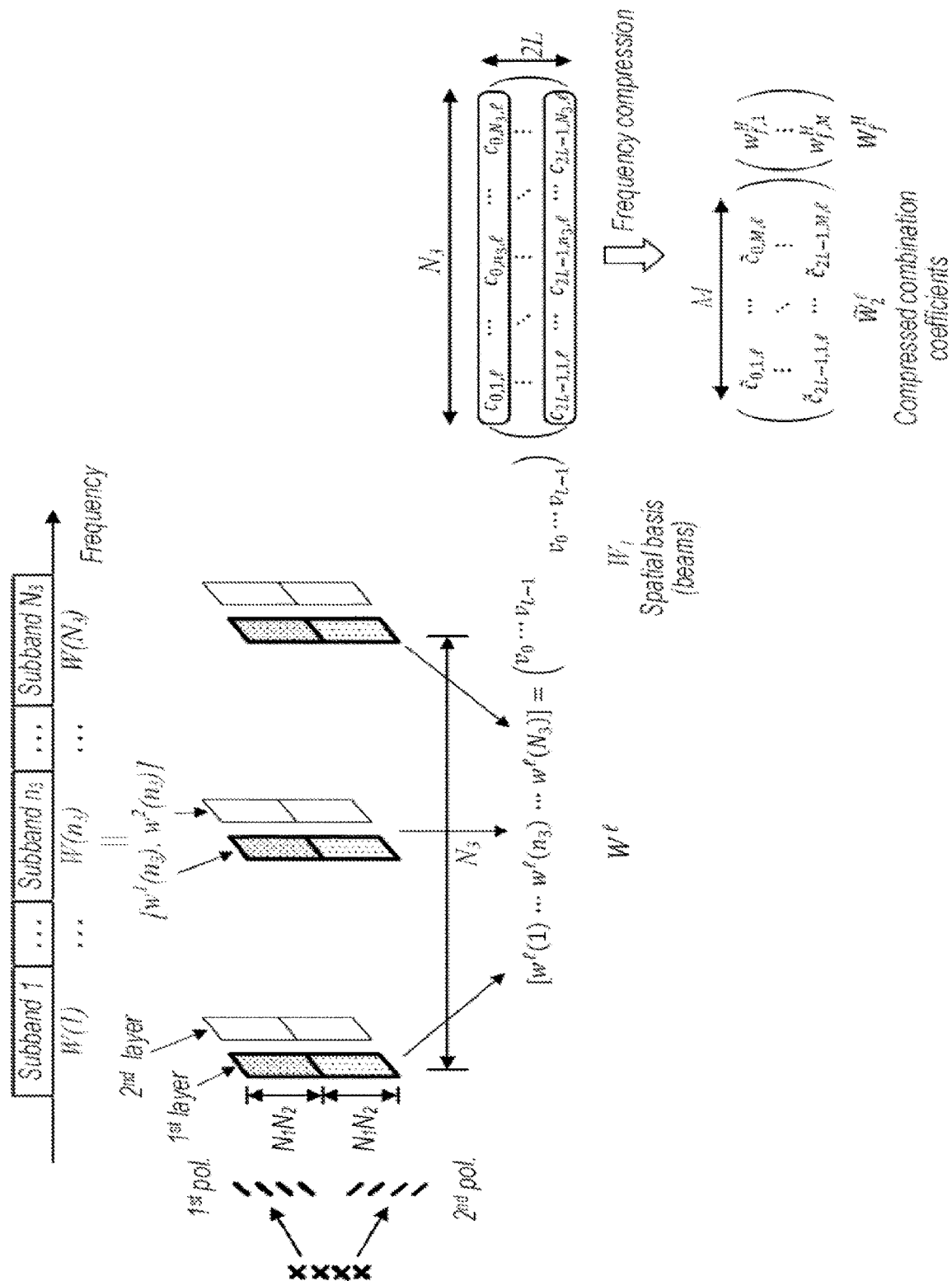
FIG. 10 shows an exemplary diagram illustrating CBSR associated with Type II CSI reporting, which may be used with certain embodiments.

FIG. 10 shows an exemplary diagram illustrating CBSR associated with Type II CSI reporting, which may be used with certain embodiments. As previously mentioned, overhead may consume substantial uplink bandwidth. In some embodiments, in order to reduce overhead, frequency compression of the combination (or weighting) coefficients may be introduced. Therefore, in addition to spatial basis considerations (previously described), frequency basis may also be considered. If a channel is less frequency-selective, neighboring coefficients may exhibit similarity. For example, $\{c_{i,n3,1}\}_{n3=1}^{N3}$ are correlated. That is, the combination coefficients across the frequency may have some correlation (they may be correlated across the frequency). If this correlation is extracted to enable decorrelation, then the coefficients may be presented by a small set of frequency bases, $W_f$. Therefore, the overhead may be reduced by compressing the combination coefficient ($\{c_{i,n31}\}_{n3=1}^{N3}$) across the frequency dimension. Each coefficient may then be based on M bases, where M represents the corresponding number of bases and is less than $N_3$, that is, $M<N_3$. This allows the UE to report a small number of combination coefficients while also reporting the frequency basis (or bases) to have the base station reconstruct the first subband combination coefficients. Coding vectors may therefore be presented not only in the spatial dimension but also in frequency dimension. As noted in FIG. 10, $W_1$ represents the spatial basis column (which may also be referred to herein as a port selection matrix), $W_2$ provides combination coefficients across the selected ports for the N3 PMI subbands, and $W_f$ represents the frequency basis column.

The UE may be restricted from reporting CSI based on a subset of frequency bases per base station configuration, in addition to a spatial basis restriction per the base station configuration. In some embodiments, the maximum allowed amplitude may be separately configured for a spatial basis and for a frequency basis, yielding a separate maximum allowed amplitude based on spatial consideration and a separate maximum allowed amplitude based on frequency consideration. The maximum allowed amplitude may be layer specific, i.e., each layer may be configured with a different maximum allowed amplitude for different ranks. At least three different combinations of spatial/frequency basis consideration may be implemented. In a first implementation, a UE may be configured with restricted spatial basis dependent amplitude and unrestricted frequency basis dependent amplitude. In a second implementation, the UE may be configured with restricted frequency basis dependent amplitude and unrestricted spatial basis dependent amplitude. Finally, in a third implementation, the UE may be configured with both restricted spatial basis dependent amplitude and restricted frequency basis dependent amplitude.

Separate Spatial and Frequency Restrictions.

In some embodiments, both the maximum allowed amplitude for spatial basis and the maximum allowed amplitude for frequency basis may be configured. This may be implemented in a variety of different embodiments which may be grouped into three different alternatives. In a first alternative, the amplitude of each coefficient may be represented by at most three components, as expressed by the equation $c_{i,m,1} = P_{i,1}^{(1)} P_{m,1}^{(2)} P_{m,1}^{(3)} \cdot \emptyset_{i,m,1}$, where the three components are: a spatial basis dependent amplitude ($P_{i,1}^{(1)}$); a frequency basis dependent amplitude ($P_{m,1}^{(3)}$); and an amplitude dependent on both spatial basis and frequency basis $(P_{i,m,1}^{(2)})$; where $(P_{i,1}^{(1)})$ and $(P_{i,1}^{(1)})$ may not exceed the configured maximum allowed value(s), respectively. In a second alternative, the amplitude of each coefficient may be represented by a single component $P_{i,m,1}$, where $P_{i,m,1}$ may not exceed the maximum allowed value configured for the corresponding spatial basis (or bases), and may also not exceed the maximum allowed value configured for the corresponding frequency basis (or bases). In a third alternative, the amplitude of each coefficient may be represented by a single component $P_{i,m,1}$, where $P_{i,m,1}$ may not exceed the product of the maximum allowed values configured for the corresponding spatial basis (or bases) and frequency basis (or bases).

Figure 11:
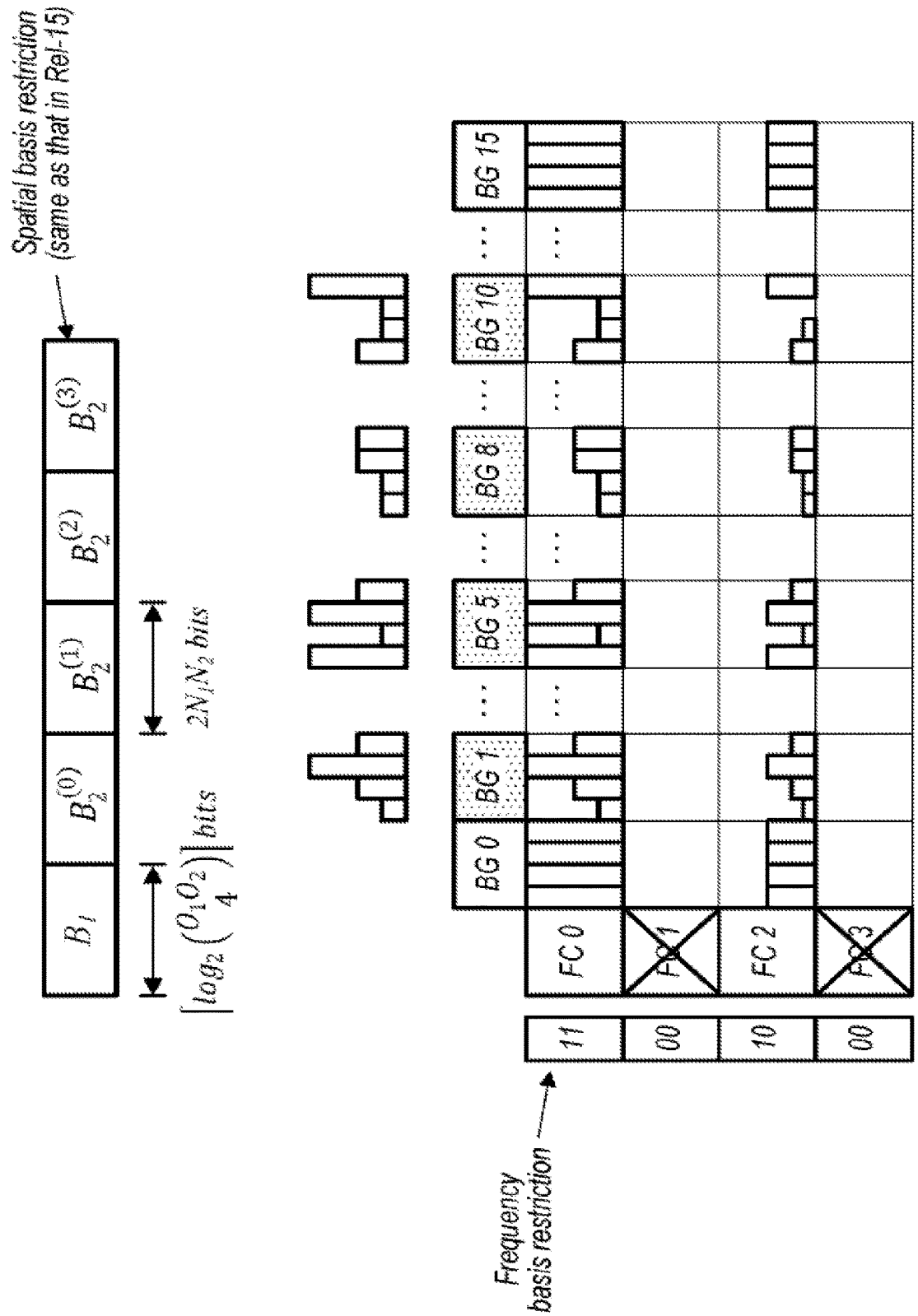
FIG. 11 shows a diagram illustrating one example of separate spatial basis and frequency basis restrictions, according to some embodiments.

FIG. 11 shows a diagram illustrating one example of separate spatial basis and frequency basis restrictions, according to some embodiments. In embodiments exemplified in FIG. 11, a 2-bit indication may be provided to the UE by the base station for each frequency component. That is, for each frequency basis (FC), a 2-bit amplitude restriction may be configured. When the amplitude is set to zero for a given frequency component, the given frequency component is restricted entirely. In other words, the given frequency component may not be considered for CSI (or PMI) reporting by the UE. As shown in FIG. 11, for FC 0, the amplitude restriction is 1, for FC 2, the amplitude restriction is ½, and FCs 1 and 3 are entirely restricted from CSI reporting. In the bottom diagram of FIG. 11, the frequency basis restriction is indicated on the vertical axis while the spatial basis restriction is indicated on the horizontal axis. In certain embodiments, beam groups 1, 5, 8, and 10 are restricted on a spatial basis.

Joint Spatial-Frequency Restriction.

Figure 12:
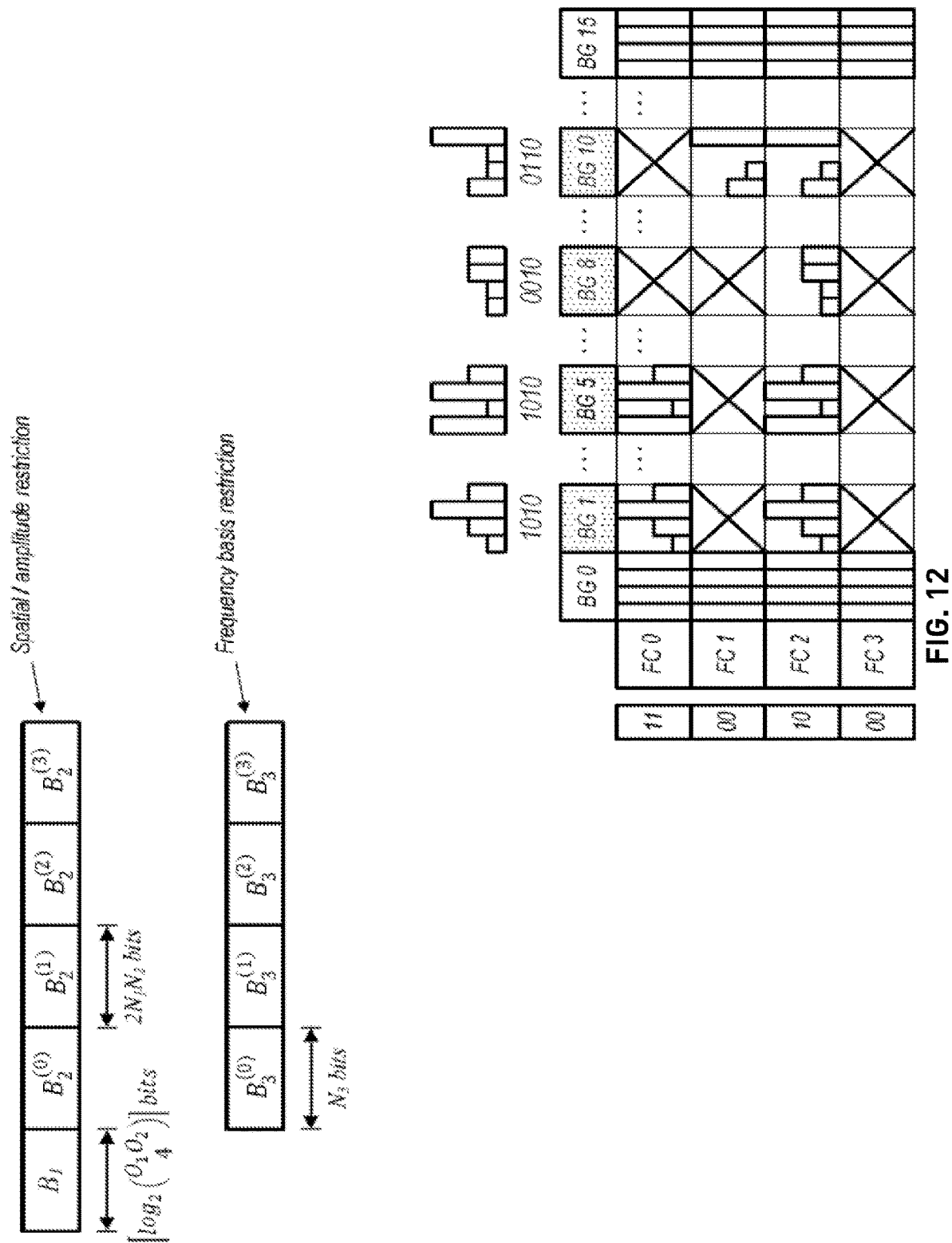
FIG. 12 shows a diagram illustrating one example of joint spatial-frequency restriction, according to some embodiments.

FIG. 12 shows a diagram illustrating one example of joint spatial-frequency restriction, according to some embodiments. As illustrated in FIG. 12, a UE may be restricted from reporting a subset of combinations of spatial and frequency bases per base station configuration. In such a case the UE may be configured with a subset of spatial basis groups, with a set of frequency basis restriction configured for each spatial basis group. When a frequency basis is restricted, it may not be considered (by the UE) for CSI reporting with the associated spatial basis. For each spatial basis group, a maximum allowed amplitude may be configured for each basis in the group. That is, a maximum allowed amplitude may be indicated for each combination. For each beam group, the frequency component to be used may also be indicated. For maximum amplitude, the configuration for the beam groups may still be followed.

In the example shown in FIG. 12, for each restricted spatial beam group, a specific frequency basis restriction is configured. On the other hand, for spatial basis groups without restriction, the frequency basis is not restricted. In contrast to the example shown in FIG. 11, where frequency bases 1 and 3 were restricted completely (regardless of spatial basis), in the example of FIG. 12, spatially unrestricted beam groups 0 and 15 are not frequency restricted. However, as indicated by the respective frequency basis restriction for each spatially restricted beam group (1, 5, 8, and 10), each spatially restricted beam group may also have a frequency basis restriction applied as shown.

In some embodiments, frequency basis restriction and spatial basis restriction may not be applied simultaneously. That is, restriction may be either on a spatial basis or a frequency basis, depending on certain parameters. For example, the applicability of spatial/frequency restriction may be dependent on the spatial/frequency granularity. Considering the number ($N_1$, $N_2$) of transmit ports or antennas, a smaller number of antennas (e.g. $N_1$ and $N_2$ are both either equal to or lower than four) may suggest wider spatial beams and less PMI hypotheses, for which a spatial basis restriction may be less efficient, and therefore a frequency basis restriction may be preferred. Thus, in some embodiments, for CBSR, a frequency basis restriction may be provided by the base station to the UE but not a spatial basis restriction. On the other hand, a larger number of antennas (e.g. $N_1$ and $N_2$ are both either equal to or larger than 8) may suggest narrow spatial beams and more PMI hypotheses, for which each spatial beam may correspond to a single frequency basis, therefore a spatial basis restriction may be sufficient. Thus, in some embodiments, for CBSR, a spatial basis restriction may be provided by the base station to the UE but not a frequency basis restriction. Thus, frequency basis restriction may be supported for some combination of (N1, N2), and the configuration of frequency basis restriction may be at least partially based on the value of (N1, N2).

Configuring the Number of Frequency Bases for Enhanced Type II CSI Reporting.

Figure 13:
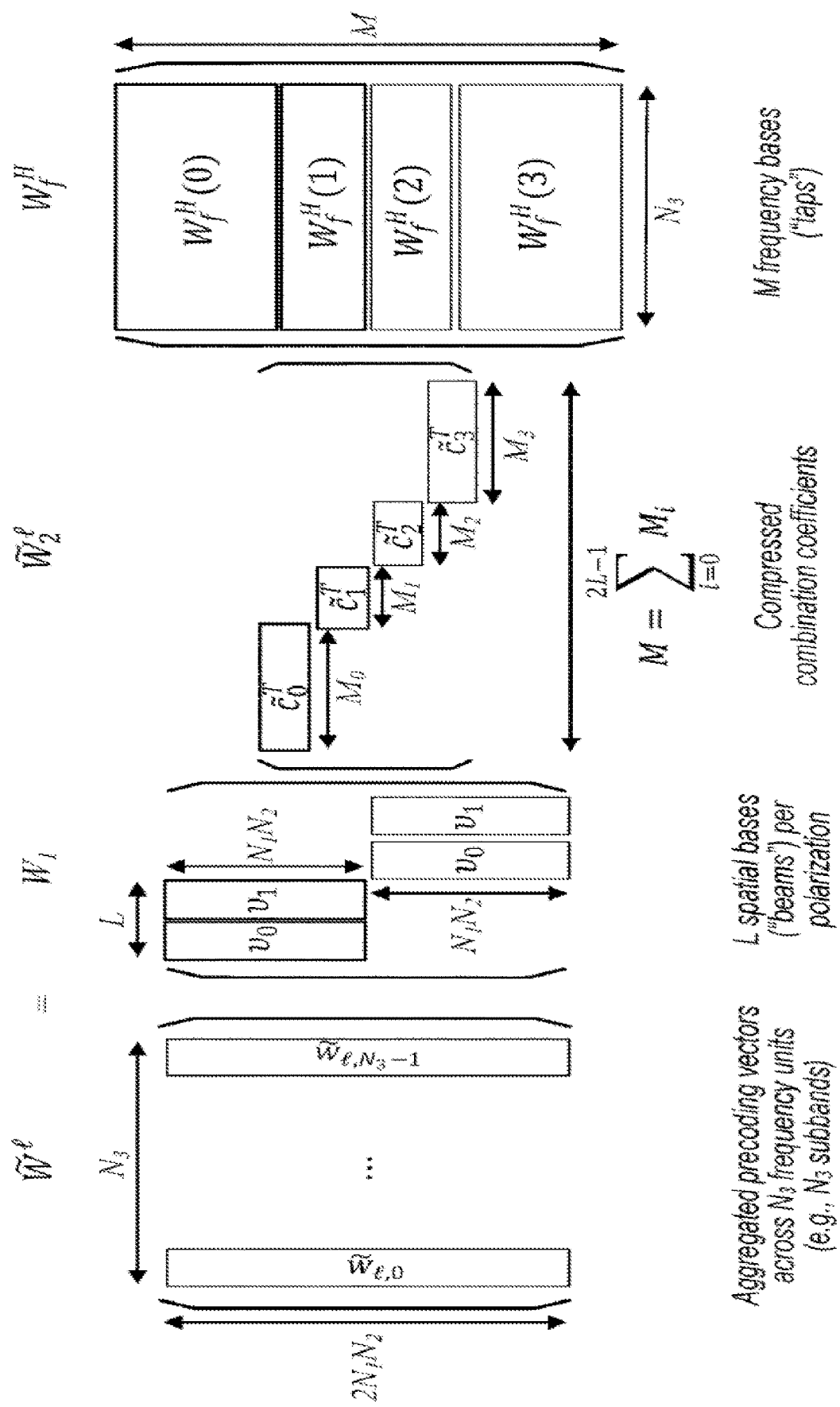
FIG. 13 shows a diagram of an exemplary precoder structure with frequency compression, according to some embodiments.

As previously mentioned, in some embodiments, the frequency basis may be beam specific. For example, frequency basis may be considered for different polarizations and for different spatial beams. FIG. 13 shows a diagram of an exemplary precoder structure with frequency compression, according to some embodiments. The equation in FIG. 13 represents the aggregated precoding vector for the lth layer. In the exemplary configuration shown in FIG. 13, there are L spatial bases (or beams) per polarization, with L=2 and the spatial bases (per polarization) denoted by $v_0$ and $v_1$, respectively. As shown in FIG. 13, $v_0$ represents the first spatial beam (or spatial basis) of the first polarization with corresponding number $M_0$ frequency bases. The second spatial beam (or spatial basis) $v_1$ in the first polarization may have a smaller corresponding number $M_1$ of frequency bases. Similarly, $v_0$ for the second polarization has a corresponding number $M_2$ of frequency bases, and $v_1$ for the second polarization has a corresponding number $M_3$ of frequency bases. That is, $M_0$ represents the number of frequency bases corresponding to $v_0$ in the first polarization, $M_1$ represents the number of frequency bases corresponding to $v_1$ in the first polarization, $M_2$ represents the number of frequency bases corresponding to $v_0$ in the second polarization, and $M_3$ represents the number of frequency bases corresponding to $v_1$ in the second polarization. Upon determining the respective values of $M_0$, $M_1$, $M_2$ and $M_3$, the value of M may be obtained, which corresponds to the (horizontal) dimension of the $W_2$ matrix. Accordingly, M (or the value of M) also represents the number of overall frequency bases (or vertical dimension) of the $W_f$ matrix. $N_3$ (or the value of $N_3$) represents the number of frequency units (e.g. the number of PMI subbands).

For each ith spatial basis, the corresponding combination coefficient is a linear combination of the corresponding number $M_i$ of frequency bases. The value of $M_i$ maybe selected by the UE and reported in CSI, or it may be configured in the UE by the base station via higher-layer (e.g., RRC) signaling. In some embodiments, referred to as explicit configuration, the base station may configure the value in the UE via dedicated radio resource control (RRC) signaling. For example, the UE may obtain the value of $M_i$ explicitly from the base station via dedicated higher-layer (e.g. RRC) signaling. In some embodiments, referred to as implicit configuration, the value may be derived by the UE from some other RRC parameters based on specified, predefined rules.

In a first implementation, the value of $M_i$ may be a function of the number of ports in both dimensions (vertical and horizontal). That is, the value of $M_i$ may be a function of ($N_1$, $N_2$). A large number of $N_1$ and $N_2$ (equal to or greater than eight, for example) may result in a narrower spatial beam, and a small Mi value may therefore be sufficient.

In a second implementation, the frequency dimension may be considered. Here the UE may be required to report a large number of subbands. The value of $M_i$ may be a function of $N_3$. A large $N_3$ value may result in more resolvable paths, therefore a large $M_i$ value may be preferable. E.g., $M_i = f_2(N_3)$.

In a third implementation, both spatial and frequency considerations may be taken into account. In this case the value of $M_i$ may be a function of ($N_1$, $N_2$, $N_3$), and the spatial-temporal granularity may be jointly considered. E.g., $M_i = f_3$ (max ($N_1$, $N_2$), $N_3$).

Configuring PMI Frequency Compression Units for Enhanced NR Type II CSI.

Referring again to FIG. 10, consideration may be given to determining the length of the frequency basis. In practical terms this leads to determining how to choose the dimension of the $W_f$ matrix. It should be noted that there is a clear relationship between the frequency and the time domain (Fourier Transform), which makes it possible to use a Fast Fourier Transform (FFT). For example if the UE is required to report CSI for a specified number (e.g., five) of subbands, then the column of $W_f$ may have a corresponding same number (in this example five) entries. The value for each subband may be obtained. In proposed systems, the number of resource blocks (RBs) may range from 1 to 275 (as an example of the wider range). Thus, FFT may be supported for this range. A relationship/link may be established between the number of CSI frequency units and the FFT size for the dimension of $W_f$.

The frequency basis in $W_f$ may be a subset of DFT vectors. The dimension of the frequency basis may thus equal to the number of CSI frequency units (e.g., the number of subbands as indicated in the CSI reporting band). The number of subbands may be any integer in a specified range, for example in the range of 1 to 19, according to current 3GPP specifications. For finer PMI frequency units, the dimension of the frequency basis may vary in a much wider range, e.g. from 1 to hundreds. As mentioned above, the frequency compression may be implemented through FFT. In order to facilitate the implementation, the dimension of the frequency basis (e.g., FFT size) may be carefully selected.

Figure 14:
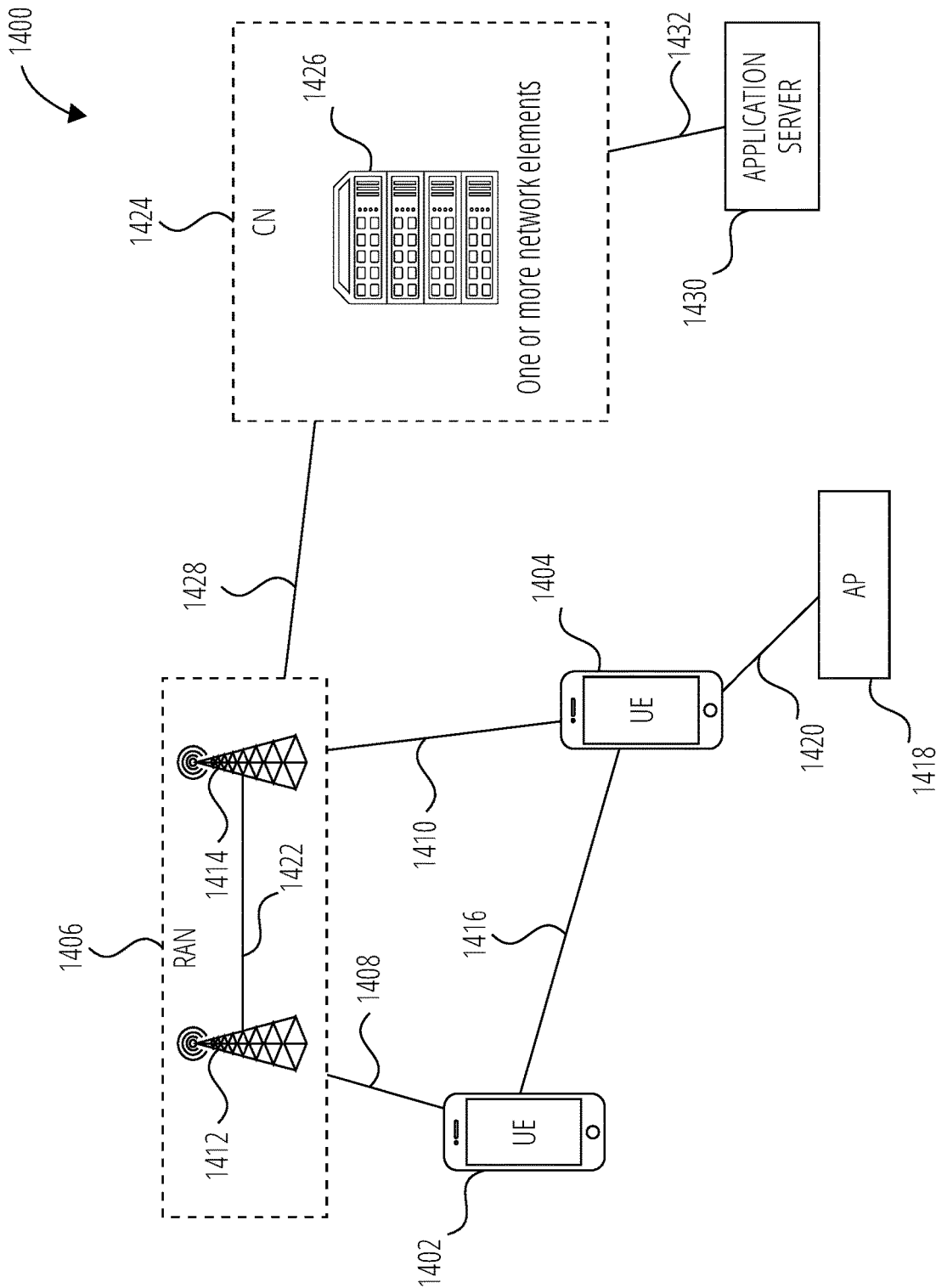
FIG. 14 illustrates an example architecture of a wireless communication system, according to embodiments disclosed herein.

FIG. 14 illustrates an example architecture of a wireless communication system 1400, according to embodiments disclosed herein. The following description is provided for an example wireless communication system 1400 that operates in conjunction with the LTE system standards and/or 5G or NR system standards as provided by 3GPP technical specifications.

As shown by FIG. 14, the wireless communication system 1400 includes UE 1402 and UE 1404 (although any number of UEs may be used). In this example, the UE 1402 and the UE 1404 are illustrated as smartphones (e.g., handheld touchscreen mobile computing devices connectable to one or more cellular networks), but may also comprise any mobile or non-mobile computing device configured for wireless communication.

The UE 1402 and UE 1404 may be configured to communicatively couple with a RAN 1406. In embodiments, the RAN 1406 may be NG-RAN, E-UTRAN, etc. The UE 1402 and UE 1404 utilize connections (or channels) (shown as connection 1408 and connection 1410, respectively) with the RAN 1406, each of which comprises a physical communications interface. The RAN 1406 can include one or more base stations, such as base station 1412 and base station 1414, that enable the connection 1408 and connection 1410.

In this example, the connection 1408 and connection 1410 are air interfaces to enable such communicative coupling, and may be consistent with RAT(s) used by the RAN 1406, such as, for example, an LTE and/or NR.

In some embodiments, the UE 1402 and UE 1404 may also directly exchange communication data via a sidelink interface 1416. The UE 1404 is shown to be configured to access an access point (shown as AP 1418) via connection 1420. By way of example, the connection 1420 can comprise a local wireless connection, such as a connection consistent with any IEEE 802.11 protocol, wherein the AP 1418 may comprise a Wi-Fi® router. In this example, the AP 1418 may be connected to another network (for example, the Internet) without going through a CN 1424.

In embodiments, the UE 1402 and UE 1404 can be configured to communicate using orthogonal frequency division multiplexing (OFDM) communication signals with each other or with the base station 1412 and/or the base station 1414 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 1412 or base station 1414 may be implemented as one or more software entities running on server computers as part of a virtual network. In addition, or in other embodiments, the base station 1412 or base station 1414 may be configured to communicate with one another via interface 1422. In embodiments where the wireless communication system 1400 is an LTE system (e.g., when the CN 1424 is an EPC), the interface 1422 may be an X2 interface. The X2 interface may be defined between two or more base stations (e.g., two or more eNBs and the like) that connect to an EPC, and/or between two eNBs connecting to the EPC. In embodiments where the wireless communication system 1400 is an NR system (e.g., when CN 1424 is a 5GC), the interface 1422 may be an Xn interface. The Xn interface is defined between two or more base stations (e.g., two or more gNBs and the like) that connect to 5GC, between a base station 1412 (e.g., a gNB) connecting to 5GC and an eNB, and/or between two eNBs connecting to 5GC (e.g., CN 1424).

The RAN 1406 is shown to be communicatively coupled to the CN 1424. The CN 1424 may comprise one or more network elements 1426, which are configured to offer various data and telecommunications services to customers/subscribers (e.g., users of UE 1402 and UE 1404) who are connected to the CN 1424 via the RAN 1406. The components of the CN 1424 may be implemented in one physical device or separate physical devices including components to read and execute instructions from a machine-readable or computer-readable medium (e.g., a non-transitory machine-readable storage medium).

In embodiments, the CN 1424 may be an EPC, and the RAN 1406 may be connected with the CN 1424 via an S1 interface 1428. In embodiments, the S1 interface 1428 may be split into two parts, an S1 user plane (S1-U) interface, which carries traffic data between the base station 1412 or base station 1414 and a serving gateway (S-GW), and the S1-MME interface, which is a signaling interface between the base station 1412 or base station 1414 and mobility management entities (MMEs).

In embodiments, the CN 1424 may be a 5GC, and the RAN 1406 may be connected with the CN 1424 via an NG interface 1428. In embodiments, the NG interface 1428 may be split into two parts, an NG user plane (NG-U) interface, which carries traffic data between the base station 1412 or base station 1414 and a user plane function (UPF), and the S1 control plane (NG-C) interface, which is a signaling interface between the base station 1412 or base station 1414 and access and mobility management functions (AMFs).

Generally, an application server 1430 may be an element offering applications that use internet protocol (IP) bearer resources with the CN 1424 (e.g., packet switched data services). The application server 1430 can also be configured to support one or more communication services (e.g., VoIP sessions, group communication sessions, etc.) for the UE 1402 and UE 1404 via the CN 1424. The application server 1430 may communicate with the CN 1424 through an IP communications interface 1432.

Figure 15:
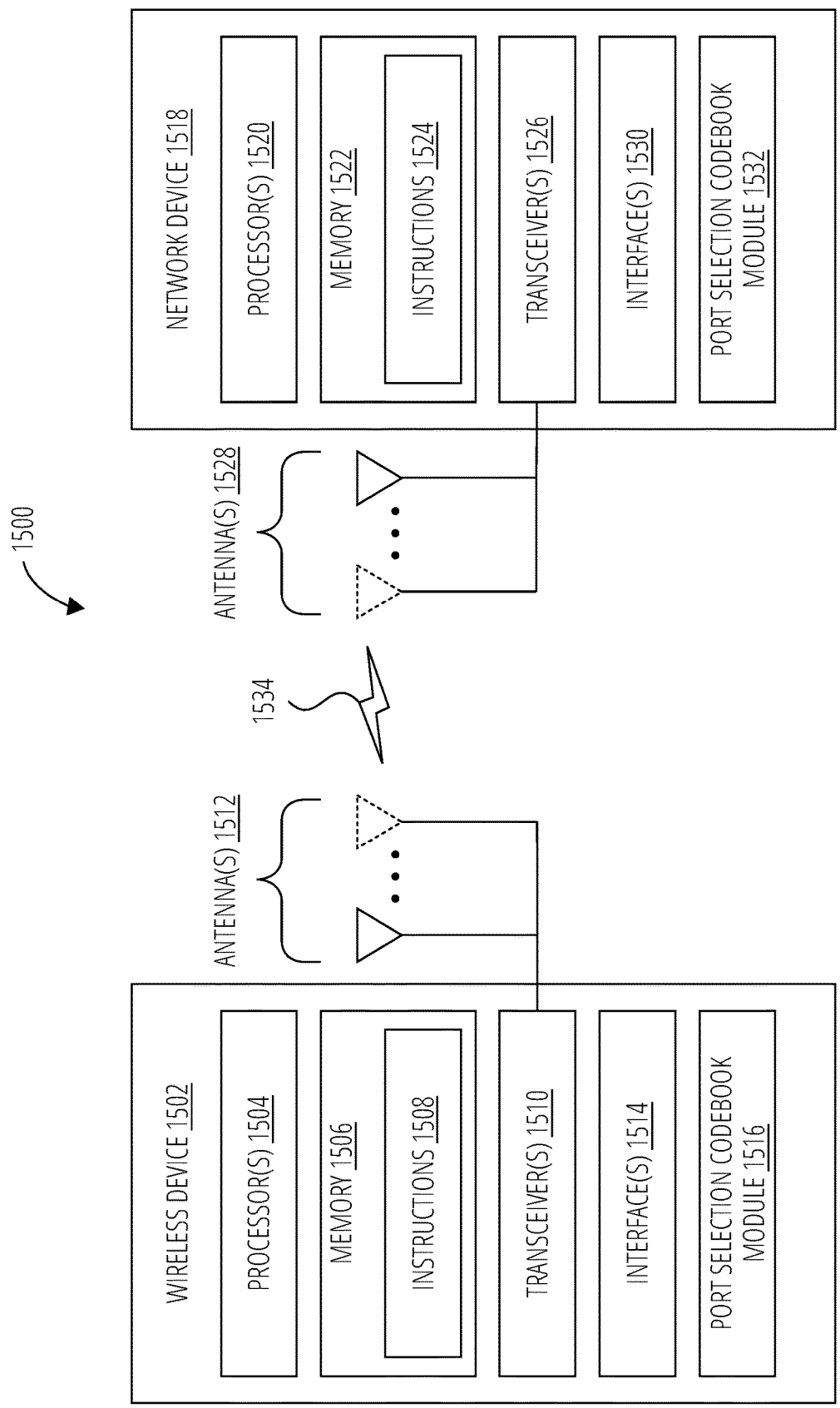
FIG. 15 illustrates a system for performing signaling between a wireless device and a network device, according to embodiments disclosed herein.

FIG. 15 illustrates a system 1500 for performing signaling 1534 between a wireless device 1502 and a network device 1518, according to embodiments disclosed herein. The system 1500 may be a portion of a wireless communications system as herein described. The wireless device 1502 may be, for example, a UE of a wireless communication system. The network device 1518 may be, for example, a base station (e.g., an eNB or a gNB) of a wireless communication system.

The wireless device 1502 may include one or more processor(s) 1504. The processor(s) 1504 may execute instructions such that various operations of the wireless device 1502 are performed, as described herein. The processor(s) 1504 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 1502 may include a memory 1506. The memory 1506 may be a non-transitory computer-readable storage medium that stores instructions 1508 (which may include, for example, the instructions being executed by the processor(s) 1504). The instructions 1508 may also be referred to as program code or a computer program. The memory 1506 may also store data used by, and results computed by, the processor(s) 1504.

The wireless device 1502 may include one or more transceiver(s) 1510 that may include radio frequency (RF) transmitter and/or receiver circuitry that use the antenna(s) 1512 of the wireless device 1502 to facilitate signaling (e.g., the signaling 1534) to and/or from the wireless device 1502 with other devices (e.g., the network device 1518) according to corresponding RATs.

The wireless device 1502 may include one or more antenna(s) 1512 (e.g., one, two, four, or more). For embodiments with multiple antenna(s) 1512, the wireless device 1502 may leverage the spatial diversity of such multiple antenna(s) 1512 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 1502 may be accomplished according to precoding (or digital beamforming) that is applied at the wireless device 1502 that multiplexes the data streams across the antenna(s) 1512 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 1502 may implement analog beamforming techniques, whereby phases of the signals sent by the antenna(s) 1512 are relatively adjusted such that the (joint) transmission of the antenna(s) 1512 can be directed (this is sometimes referred to as beam steering).

The wireless device 1502 may include one or more interface(s) 1514. The interface(s) 1514 may be used to provide input to or output from the wireless device 1502. For example, a wireless device 1502 that is a UE may include interface(s) 1514 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 1510/antenna(s) 1512 already described) that allow for communication between the UE and other devices and may operate according to known protocols (e.g., Wi-Fi®, Bluetooth®, and the like).

The wireless device 1502 may include a port selection codebook module 1516. The port selection codebook module 1516 may be implemented via hardware, software, or combinations thereof. For example, the port selection codebook module 1516 may be implemented as a processor, circuit, and/or instructions 1508 stored in the memory 1506 and executed by the processor(s) 1504. In some examples, the port selection codebook module 1516 may be integrated within the processor(s) 1504 and/or the transceiver(s) 1510. For example, the port selection codebook module 1516 may be implemented by a combination of software components (e.g., executed by a DSP or a general processor) and hardware components (e.g., logic gates and circuitry) within the processor(s) 1504 or the transceiver(s) 1510.

The port selection codebook module 1516 may be used for various aspects of the present disclosure. For example, the port selection codebook module 1516 may be configured to perform the method 400 shown in FIG. 4 and/or the method 500 shown in FIG. 5.

The network device 1518 may include one or more processor(s) 1520. The processor(s) 1520 may execute instructions such that various operations of the network device 1518 are performed, as described herein. The processor(s) 1504 may include one or more baseband processors implemented using, for example, a CPU, a DSP, an ASIC, a controller, an FPGA device, another hardware device, a firmware device, or any combination thereof configured to perform the operations described herein.

The network device 1518 may include a memory 1522. The memory 1522 may be a non-transitory computer-readable storage medium that stores instructions 1524 (which may include, for example, the instructions being executed by the processor(s) 1520). The instructions 1524 may also be referred to as program code or a computer program. The memory 1522 may also store data used by, and results computed by, the processor(s) 1520.

The network device 1518 may include one or more transceiver(s) 1526 that may include RF transmitter and/or receiver circuitry that use the antenna(s) 1528 of the network device 1518 to facilitate signaling (e.g., the signaling 1534) to and/or from the network device 1518 with other devices (e.g., the wireless device 1502) according to corresponding RATs.

The network device 1518 may include one or more antenna(s) 1528 (e.g., one, two, four, or more). In embodiments having multiple antenna(s) 1528, the network device 1518 may perform MIMO, digital beamforming, analog beamforming, beam steering, etc., as has been described.

The network device 1518 may include one or more interface(s) 1530. The interface(s) 1530 may be used to provide input to or output from the network device 1518. For example, a network device 1518 that is a base station may include interface(s) 1530 made up of transmitters, receivers, and other circuitry (e.g., other than the transceiver(s) 1526/antenna(s) 1528 already described) that enables the base station to communicate with other equipment in a core network, and/or that enables the base station to communicate with external networks, computers, databases, and the like for purposes of operations, administration, and maintenance of the base station or other equipment operably connected thereto.

The network device 1518 may include a port selection codebook module 1532. The port selection codebook module 1532 may be implemented via hardware, software, or combinations thereof. For example, the port selection codebook module 1532 may be implemented as a processor, circuit, and/or instructions 1524 stored in the memory 1522 and executed by the processor(s) 1520. In some examples, the port selection codebook module 1532 may be integrated within the processor(s) 1520 and/or the transceiver(s) 1526. For example, the port selection codebook module 1532 may be implemented by a combination of software components (e.g., executed by a DSP or a general processor) and hardware components (e.g., logic gates and circuitry) within the processor(s) 1520 or the transceiver(s) 1526.

The port selection codebook module 1532 may be used for various aspects of the present disclosure. For example, the port selection codebook module 1532 may be configured to perform the method 600 shown in FIG. 6.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a base station, the method comprising:
generating, at the base station, a channel state information (CSI) report configuration (CSI-ReportConfig) for a user equipment (UE), the CSI-ReportConfig indicating up to L CSI reference signal (CSI-RS) ports for selection by the UE out of P CSI-RS ports configured for measuring and reporting CSI, the CSI-ReportConfig further indicating a subset of frequency basis for the UE to select;
receiving, at the base station, a port selection matrix $W_1$ from the UE corresponding to selected CSI-RS ports out of the P CSI-RS ports;
receiving, at the base station, a matrix $W_2$ from the UE comprising compressed combination coefficients;
receiving, at the base station, a frequency basis selection matrix $W_f$ corresponding to a selected subset of frequency basis;
configuring a window constrained selection of the subset of the frequency basis, wherein the UE is constrained to select from consecutive k*Mv frequency basis out of N frequency basis, where k is an integer and k*Mv<N;
determining, at the base station, a precoding matrix index (PMI) matrix $W=W_1*W_2*W_f$;
generating, at the base station, physical downlink shared channel (PDSCH) demodulation reference signal (DMRS) transmissions for the UE using the PMI matrix W; and
configuring the UE to select a direct current (DC) frequency basis and any Mv−1 out of N−1 frequency basis, and to report the frequency basis selection matrix $W_f$ using a bit width of $\lceil \log_2(C(N-1, Mv-1)) \rceil$.

2. The method of claim 1, wherein the port selection matrix $W_1$ is a P×L matrix, wherein each of L columns in the port selection matrix $W_1$ is P×1 with only one entry in each of the L columns comprising a 1 and other entries in each of the L columns comprising a 0, and wherein different ones of the L columns in the port selection matrix $W_1$ are not the same as one another.

3. The method of claim 1, wherein the port selection matrix $W_1$ is given by $$W_1 = \begin{pmatrix} W_{1,1} & 0 \\ 0 & W_{1,1} \end{pmatrix},$$

wherein $W_{1,1}$ is a P/2×L matrix, wherein each of L columns in $W_{1,1}$ is P/2×1 with only one entry in each of the L columns comprising a 1 and other entries in each of the L columns comprising a 0, wherein different columns in $W_{1,1}$ cannot be the same, and wherein first P/2 CSI-RS ports are horizontally polarized (H-pol) and second P/2 CSI-RS ports are vertically polarized (V-pol).

4. The method of claim 1, wherein the port selection matrix $W_1$ is given by $$W_1 = \begin{pmatrix} W_{1,1} & 0 \\ 0 & W_{1,2} \end{pmatrix},$$

wherein $W_{1,1}$ and $W_{1,2}$ are each a P/2×L matrix, wherein in each of L columns in $W_{1,1}$ or $W_{1,2}$ only one entry is a 1 and other entries are a 0, wherein different columns in $W_{1,1}$ or $W_{1,2}$ cannot be the same, and wherein first P/2 CSI-RS ports are horizontally polarized (H-pol) and second P/2 CSI-RS ports are vertically polarized (V-pol).

5. The method of claim 1, further comprising turning off the frequency basis selection matrix $W_f$, wherein the PMI matrix W degenerates into $W=W_1$, wherein the port selection matrix $W_1$ is a column vector that selects the L CSI-RS ports, wherein the port selection matrix $W_1$ comprises L non-zero entries, and wherein each of the L non-zero entries comprises a phase and amplitude factor for a combination coefficient for a corresponding port.

6. The method of claim 1, further comprising turning off the frequency basis selection matrix $W_f$, wherein the PMI matrix W degenerates into $W=W_1W_2$, wherein $W_2$ comprises more than one column, wherein each column corresponds to a PMI subband, wherein for each column there is at most L non-zero entries, and wherein each of the L non-zero entries comprises a phase and amplitude factor for a combination coefficient for a corresponding port.

7. The method of claim 1, wherein a total number of PMI subbands for frequency basis selection is $N_{OQISubband}*R$, where $N_{OQISubband}$ is a number of channel quality indicator (CQI) subbands configured by the base station and R is a size of a CQI subband divided by a size of a PMI subband.

8. The method of claim 1, further comprising configuring the UE for at least one of wideband channel quality indicator (CQI) reporting and wideband PMI reporting.

9. The method of claim 1, further comprising receiving, at the base station, an indication from the UE of a location of the consecutive k*Mv frequency basis.

10. The method of claim 1, further comprising configuring a location of the consecutive k*Mv frequency basis for the UE.

11. The method of claim 1, wherein the CSI-ReportConfig comprises a list of frequency basis subsets, wherein each entry in the list configures a different subset of frequency basis for the UE to select.

12. A non-transitory computer-readable medium comprising instructions that, when executed by one or more processors of a base station, configure the base station to:
  generate, at the base station, a channel state information (CSI) report configuration (CSI-ReportConfig) for a user equipment (UE), the CSI-ReportConfig indicating up to L CSI reference signal (CSI-RS) ports for selection by the UE out of P CSI-RS ports configured for measuring and reporting CSI, the CSI-ReportConfig further indicating a subset of frequency basis for the UE to select;
  receive, at the base station, a port selection matrix $W_1$ from the UE corresponding to selected CSI-RS ports out of the P CSI-RS ports;
  receive, at the base station, a matrix $W_2$ from the UE comprising compressed combination coefficients;
  receive, at the base station, a frequency basis selection matrix $W_f$ corresponding to a selected subset of frequency basis, wherein the subset of the frequency basis comprises a window constrained selection from consecutive k*Mv frequency basis out of N frequency basis, where k is an integer and k*Mv<N;
  determine, at the base station, a precoding matrix index (PMI) matrix $W=W_1*W_2*W_f$;
  generate, at the base station, physical downlink shared channel (PDSCH) demodulation reference signal (DMRS) transmissions for the UE using the PMI matrix W; and
  configuring the UE to select a direct current (DC) frequency basis and any Mv−1 out of N−1 frequency basis, and to report the frequency basis selection matrix $W_f$ using a bit width of $\lceil \log_2(C(N-1, Mv-1)) \rceil$.

13. The non-transitory computer-readable medium of claim 12, wherein the port selection matrix $W_1$ is a P×L matrix, wherein each of L columns in the port selection matrix $W_1$ is P×1 with only one entry in each of the L columns comprising a 1 and other entries in each of the L columns comprising a 0, and wherein different ones of the L columns in the port selection matrix $W_1$ are not the same as one another.

14. The non-transitory computer-readable medium of claim 12, wherein the port selection matrix $W_1$ is given by $$W1 = \begin{pmatrix} W_{1,1} & 0 \\ 0 & W_{1,1} \end{pmatrix},$$

wherein $W_{1,1}$ is a P/2×L matrix, wherein each of L columns in $W_{1,1}$ is P/2×1 with only one entry in each of the L columns comprising a 1 and other entries in each of the L columns comprising a 0, wherein different columns in $W_{1,1}$ cannot be the same, and wherein first P/2 CSI-RS ports are horizontally polarized (H-pol) and second P/2 CSI-RS ports are vertically polarized (V-pol).

15. The non-transitory computer-readable medium of claim 12, wherein the port selection matrix $W_1$ is given by $$W_1 = \begin{pmatrix} W_{1,1} & 0 \\ 0 & W_{1,2} \end{pmatrix},$$

wherein $W_{1,1}$ and $W_{1,2}$ are each a P/2×L matrix, wherein in each of L columns in $W_{1,1}$ or $W_{1,2}$ only one entry is a 1 and other entries are a 0, wherein different columns in $W_{1,1}$ or $W_{1,2}$ cannot be the same, and wherein first P/2 CSI-RS ports are horizontally polarized (H-pol) and second P/2 CSI-RS ports are vertically polarized (V-pol).

16. The non-transitory computer-readable medium of claim 12, wherein the instructions further configure the base station to turn off the frequency basis selection matrix $W_f$, wherein the PMI matrix W degenerates into $W=W_1$, wherein the port selection matrix $W_1$ is a column vector that selects the L CSI-RS ports, wherein the port selection matrix $W_1$ comprises L non-zero entries, and wherein each of the L non-zero entries comprises a phase and amplitude factor for a combination coefficient for a corresponding port.

17. The non-transitory computer-readable medium of claim 12, wherein the instructions further configure the base station to turn off the frequency basis selection matrix $W_f$, wherein the PMI matrix W degenerates into $W=W_1W_2$, wherein $W_2$ comprises more than one column, wherein each column corresponds to a PMI subband, wherein for each column there is at most L non-zero entries, and wherein each of the L non-zero entries comprises a phase and amplitude factor for a combination coefficient for a corresponding port.

* * * * *